United States Patent
Umehara et al.

(10) Patent No.: US 7,623,322 B2
(45) Date of Patent: Nov. 24, 2009

(54) THIN-FILM MAGNETIC HEAD WITH HEATER SPACED FURTHER FROM MEDIUM FACING SURFACE THAN SPLIT IN SHIELD

(75) Inventors: Tsuyoshi Umehara, Tokyo (JP); Norikazu Ota, Tokyo (JP); Katsumichi Tagami, Tokyo (JP); Hiroki Matsukuma, Tokyo (JP); Nobuya Oyama, Tokyo (JP); Soji Koide, Tokyo (JP); Yoshiyuki Mizoguchi, Tokyo (JP); Kazuhide Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 667 days.

(21) Appl. No.: 11/128,192

(22) Filed: May 13, 2005

(65) Prior Publication Data

US 2006/0007594 A1    Jan. 12, 2006

(30) Foreign Application Priority Data

Jul. 8, 2004    (JP)    ............................. 2004-202027

(51) Int. Cl.
*G11B 5/39*    (2006.01)
*G11B 5/31*    (2006.01)
*G11B 5/115*    (2006.01)
*G11B 5/56*    (2006.01)
*G11B 5/54*    (2006.01)

(52) U.S. Cl. ............... 360/317; 360/125.74; 360/294.7; 360/319

(58) Field of Classification Search .................. 360/121, 360/125.31, 125.74, 128, 294.7, 317, 319
See application file for complete search history.

(56) References Cited

U.S. PATENT DOCUMENTS

| 5,991,113 | A | 11/1999 | Meyer et al. | |
|---|---|---|---|---|
| 2002/0191326 | A1* | 12/2002 | Xu et al. | 360/75 |
| 2003/0099054 | A1 | 5/2003 | Kamijima | |
| 2003/0174430 | A1 | 9/2003 | Takahashi et al. | |
| 2004/0017638 | A1* | 1/2004 | Sato | 360/126 |
| 2004/0201920 | A1* | 10/2004 | Koide et al. | 360/317 |
| 2004/0218306 | A1* | 11/2004 | Sato et al. | 360/123 |
| 2004/0246630 | A1* | 12/2004 | Otomo | 360/317 |

FOREIGN PATENT DOCUMENTS

| JP | 2003-168274 | 6/2003 |
|---|---|---|
| JP | 2003-272335 | 9/2003 |
| JP | 2004-55067 | 2/2004 |
| JP | 2004-79115 | 3/2004 |
| WO | WO 02/37480 A1 | 5/2002 |

* cited by examiner

*Primary Examiner*—Craig A. Renner
(74) *Attorney, Agent, or Firm*—Oblon, Spivak, McClelland, Maier & Neustadt, L.L.P.

(57) ABSTRACT

The present invention relates to a thin-film magnetic head with a heater. A thin-film magnetic head includes a substrate, a magnetic read head element that has a shield area and is formed on the substrate, a magnetic write head element that has a pole area and is formed on the opposite side of the substrate with respect to the magnetic read head element, an overcoat layer that covers the magnetic read head element and the magnetic write head element and is formed on the substrate, a heater that heats at least during the magnetic read head element or the magnetic write head element in operation and is formed in the overcoat layer, and a slit area that splits the shield area in a shield length direction and is made of lower thermal conductivity material than the one of the shield area.

13 Claims, 17 Drawing Sheets

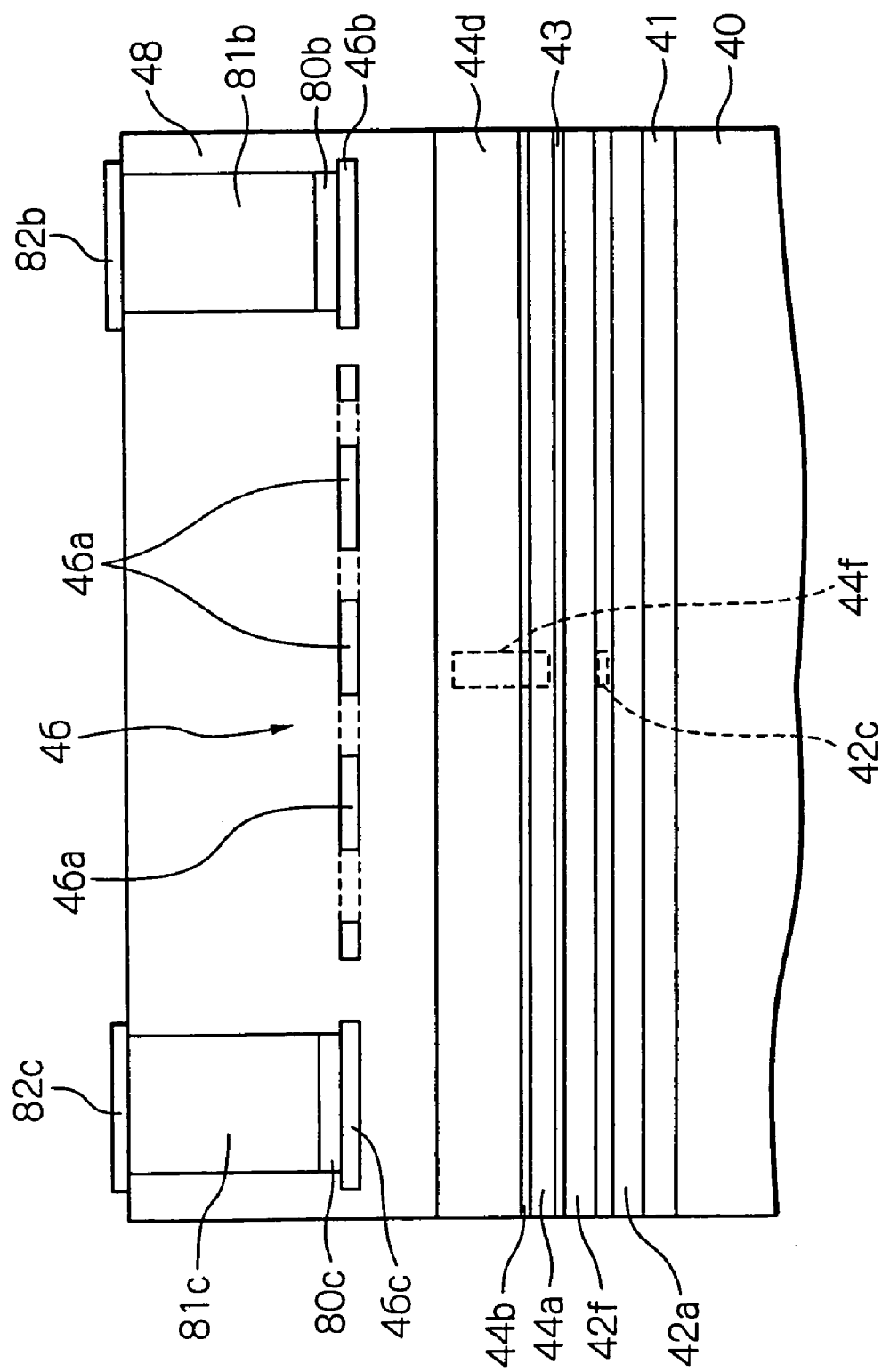

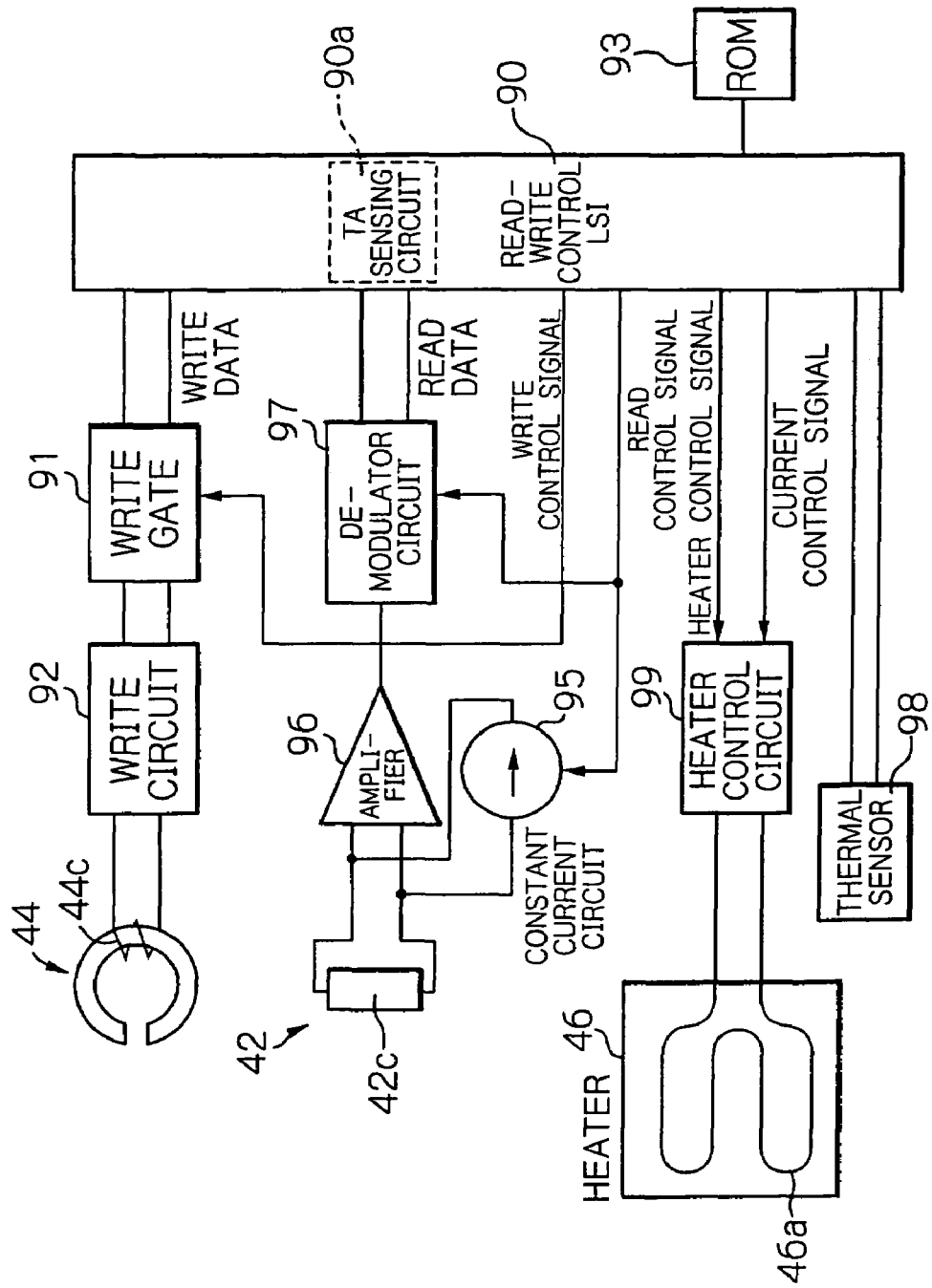

Lsh=50.0μm

WITHOUT THE SLIT AREA

Lsh=25.0μm

WITHOUT THE SLIT AREA

Lsh=50.0μm

Dslit=25.0μm

THIN-FILM MAGNETIC HEAD WITH HEATER SPACED FURTHER FROM MEDIUM FACING SURFACE THAN SPLIT IN SHIELD

PRIORITY CLAIM

This application claims priority from Japanese patent application No. 2004-202027, filed on Jul. 8, 2004, which is incorporated herein by reference.

BACKGROUND OF THE INVENTION

1. Field of the Invention

The present invention relates to a thin-film magnetic head with a heater, a head gimbal assembly (HGA) with the thin-film magnetic head and a magnetic disk drive apparatus with the HGA.

2. Description of the Related Art

In a magnetic disk drive apparatus, a thin-film magnetic head performs writing information into and reading information from a magnetic disk, which is rotated by a spindle motor. The thin-film magnetic head has an inductive write head element and a magnetoresistive (MR) read head element, both of which are formed on a slider substrate fixed at a top end section of a suspension of a HGA. While read or write operation, the thin-film magnetic head is moved to the desired position of the magnetic disk by an arm, which can swing.

The thin-film magnetic head aerodynamically flies with some height, which is called magnetic spacing $d_{MS}$ above the rotating magnetic disk, while in operation. The flying thin-film magnetic head writes information into the magnetic disk using magnetic field generated by the inductive write head element, and reads information from the magnetic disk using the MR read head element, which senses the magnetic field generated by the magnetic disk.

Recently, track width of a thin-film magnetic head rapidly becomes narrower to satisfy the requirement forever increasing data storage capacities and densities in today's magnetic disk drive apparatus. If the track width becomes narrow, signal recoding and reproducing ability in a magnetic head element to the magnetic disk will degrades. To avoid such a degradation in the signal recording ability and/or the signal reproducing ability, recent thin-film magnetic head tends to have a smaller magnetic spacing $d_{MS}$. Because the shorter the magnetic spacing $d_{MS}$ becomes, the stronger the intensity of magnetic field at the thin-film magnetic head is. Recent years, the thin-film magnetic head is designed to use about 10 ns magnetic spacing $d_{MS}$.

However, while in write operation, a coil layer of the inductive write head element generates the Joule heat, and the heat caused by eddy-current loss is generated in upper and lower pole layer. An overcoat layer expands thermally, and TPTP (Thermal Pole Tip Protrusion) phenomenon occurs, where the magnetic head element protrudes toward the magnetic disk surface. Due to TPTP, the surface of the slider, where the magnetic head elements are placed, has a curvature towards the magnetic disk. When a designed value of the magnetic spacing $d_{MS}$ is very small, thermal asperity may occur from the change in the electric resistance value of the MR read head element caused by frictional heat that is generated when the protruded part of the MR read head element contacts the magnetic disk surface.

In order to avoid this thermal asperity, methods to control magnetic spacing $d_{MS}$ has been proposed. For example, U.S. Pat. No. 5,991,113 discloses a slider having a transducer which is a magnetic head element, where a heater is formed adjacent to the transducer in the slider substrate or between the slider substrate and the transducer. The heater is heated by electrical current, and the transducer is protruded using the difference of thermal expansion coefficients between a transducer-formed region including the protection layer and the slider substrate to control the magnetic spacing $d_{MS}$.

Also, US patent publication No. 2003/174430 discloses a thin-film magnetic head structure, which reading and writing elements are brought close to a magnetic disk surface by expanding a thermally expansive element. In this structure, a heater and a thermally expansive element are positioned in a pair. Reading and writing elements are brought close to the magnetic disk surface by distorting an overcoat layer using a distortion force obtained by heating the thermally expansive element.

Further, US patent publication No. 2003/99054 discloses a thin-film magnetic head having a heating means provided in the opposite of an air bearing surface (ABS) of a magnetic head elements. While the magnetic head elements are in operation, the heating means is heated so that the magnetic head element protrudes toward the ABS direction to adjust the magnetic spacing $d_{MS}$.

However, such thin-film magnetic heads with a heater and/or a thermally expansive element have disadvantages, because the MR read head element is sensitive to the heat.

As mentioned above, with increasing data storage capacities and densities, high performance and high reliability are required for the components of the magnetic disk drive apparatus. Especially the MR read head element needs to sense weak magnetic field with high resolution in narrower track width environment, thin-film with nanometer-scale are laminated, and the size is reduced, while electric current density applied to the MR read head element becomes extremely high for getting the high outputs. Therefore temperature of the MR read head element is high even in the normal operation condition. Furthermore output of the MR read head element strongly depends on the temperature with increasing the sensibility. Therefore thermal control, especially limiting temperature rise, is mandatory for stable read operation.

However, prior art mentioned above, the heater causes further temperature rise of the MR read head element, and it worse the performance of read operation.

In case of the slider disclosed in U.S. Pat. No. 5,991,113, since the heater is formed adjacent to the transducer in the slider substrate or between the slider substrate and the transducer, the heat propagates to whole transducer-formed region including slider substrate and the protection layer. Generally, a shield layer inside the MR read head element is made of metal, and its coefficient of thermal conductivity is higher than the overcoat layer, which is made of insulating material. Therefore the heat is easy to propagate to the MR read head element, which is sandwiched between the shield layers. Furthermore, in case of the thin-film magnetic head disclosed in US patent publication No. 2003/174430 and US patent publication No. 2003/99054 mentioned above, the heater is placed close to the MR read head element, the heat propagates to the MR read head element through the shield layer more easily.

Since prior art does not have a means to prevent the heat evolved by the heater or heating means from propagating to the MR read head element, in consequence, the temperature of the MR read head element sometimes exceeds allowable maximum, so that reading performance becomes worse than desired level.

Furthermore, the heater described in U.S. Pat. No. 5,991,113 is placed inside the slider substrate, or is contacted with the slider substrate, and heating means described in US patent publication No. 2003/99054 is placed close to the slider substrate. Therefore most part of the heat evolved by the heater is absorbed by the slider substrate, which coefficient of thermal conductivity is relatively high, and emitted to outside of the thin-film magnetic head. That means thermal efficiency that causes the TPTP phenomenon becomes lower. To deal with this issue, if heating is up, it makes temperature of the MR read head element higher, because the amount of heat propagated to the MR read head element via shield layer increases, in consequence, it makes the reading performance of the MR read head element worse.

SUMMARY OF THE INVENTION

It is therefore an object of the present invention to provide a thin-film magnetic head with a heater, which utilizes TPTP phenomena actively to avoid thermal asperity by controlling the magnetic spacing $d_{MS}$, while limits the heat propagation to the MR read head element to maintain the reading performance. It is also an object of the present invention to provide a HGA with the thin-film magnetic head and magnetic disk drive apparatus with the HGA.

First, the term used in this specification is defined. PTR (Pole Tip Recession) a surface is surface that the magnetic head element faces, and faces with the magnetic disk, while in operation. Shield length $L_{sh}$ of a shield area is a length between the one end point facing the PTR surface and another end point that is opposite of the PTR surface of the shield area, where the shield area is located inside of the magnetic read head element. In case the shield area is made up of two shield layers, namely upper shield layer and lower shield layer, $UL_{sh}$ means shield length of the upper shield layer, and $LL_{sh}$ means shield length of the lower shield layer. Pole length $L_p$ of a pole part is a length between one end point facing the PTR surface and another end point that is opposite of the PTR surface of the pole area, where the pole area is located inside of the inductive write head element. In case the pole part is made up of two pole layers, namely upper pole layer and lower pole layer, $UL_p$ means pole length of the upper pole layer, and $LL_p$ means pole length of the lower pole layer.

As described later, a heater is provided in an overcoat layer covering the magnetic head element according to the present invention, distance $D_h$ is defined as the distance between the PTR surface and a point of the heater, where is closest to the PTR surface. Furthermore, a slit area is provided to the shield area as described later, the distance $D_{slit}$ is defined as the distance between the PTR surface and a point of the slit area, where is closest to the PTR surface. In case the shield layer is made up of the two shield layers, $UD_{slit}$ means the distance $D_{slit}$ for the slit area provided to the upper shield layer, and $LD_{slit}$ means the distance $D_{slit}$ for the slit area provided to the lower shield layer.

According to the invention, a thin-film magnetic head includes a substrate, a magnetic read head element that has a shield area and is formed on the substrate, a magnetic write head element that has a pole area and is formed on the opposite side of the substrate with respect to the magnetic read head element, an overcoat layer that covers the magnetic read head element and the magnetic write head element and is formed on the substrate, a heater that heats at least during the magnetic read head element or the magnetic write head element in operation and is formed in the overcoat layer, and a slit area that splits the shield area in a shield length direction and is made of lower thermal conductivity material than the one of the shield area.

The slit area is made of lower thermal conductivity material, for example thermal insulating material like $Al_2O_3$, than the lower shield area, for example NiFe. Therefore, the slit area resists the propagation of heat, which is evolved by the heater. Consequently the heat propagation from the heater to the MR effect layer is limited, and reading performance of the magnetic read head does not degrade. Furthermore, part of the shield area, which is from the slit area to opposite side of the PTR surface, acts as heat sink absorbing the Joule heat or the heat caused by eddy-current loss of the magnetic write head element. As the result, TPTP phenomena caused by the heat evolved by the magnetic write head element is suppressed. This makes the margin big in case of $d_{MS}$ adjusting by the heater.

Favorably, the distance $D_{slit}$ from the PTR surface to the slit area is less than or equal to the distance $D_h$ from the PTR surface to the heater.

Because the distance $D_{slit}$ is less than or equal to the distance $D_h$, there is no overlap portion between the heater and part of shield area, which is between the PTR surface and the slit area. Furthermore, the heater is placed some distance away from the MR effect layer, which faces the PTR surface. As the result, the part of shield area that is from slit area to opposite side of the PTR surface mainly receives the heat from the heater, while other part of shield area that is between the PTR surface and the slit area receives little amount of heat. Consequently the heat propagation from the heater to the MR effect layer is limited, and reading performance of the magnetic read head element does not degrades.

Advantageously, the distance $D_{slit}$ is more than or equal to the pole length $L_p$ of the pole area.

Because the distance $D_{slit}$ is greater than or equal to pole the length $L_p$, part of the shield area, which is between the PTR surface and the slit area, effectively shield the MR effect layer against the magnetic field from outside, for example, from the magnetic write head element.

Favorably, the shield area includes a lower shield layer and an upper shield layer formed on the opposite side of the substrate with respect to the lower shield layer, and the slit area is provided to the lower shield layer and the upper shield layer respectively.

Favorably, the distance $LD_{slit}$ from the PTR surface to the slit area provided to the lower shield layer is equal to the distance $UD_{slit}$ from the PTR surface to the slit area provided to the upper shield layer. Thus, heat resistance is realized certainly against the heat propagation.

According to the invention, a thin-film magnetic head includes a substrate, a magnetic read head element that has a shield area and is formed on the substrate, a magnetic write head element that has a pole area and is formed on the opposite side of the substrate with respect to the magnetic read head element, an overcoat layer that covers the magnetic read head element and the magnetic write head element and is formed on the substrate, and a heater that heats at least during the magnetic read head element or the magnetic write head element in operation and is formed in the overcoat layer, where the shield length $L_{sh}$ of the shield area is less than or equal to the distance $D_h$ from the PTR surface to the heater.

Because the shield length $L_{sh}$ is less than or equal to the distance $D_h$, there is no overlap portion between the shield area and the heater. Furthermore, the heater is placed some distance away from the MR effect layer, which faces the PTR surface. As the result, the heat propagation from the heater to the MR effect layer is limited, and reading performance of the magnetic read head element does not degrades.

Favorably, shield length $L_{sh}$ is more than or equal to the pole length $L_p$ of the pole area.

Since shield length $L_{sh}$ is greater than or equal to pole length $L_p$, the shield area effectively shield the MR effect layer against the magnetic field from outside, for example by the inductive write head element.

Using the shield length $L_{sh}$ described above, it is possible to maintain the reading performance of the thin-film magnetic head by limiting the heat propagation to the MR effect layer, which was inevitable according to the prior art, while the magnetic spacing $d_{MS}$ is adjusted using TPTP phenomena caused by the heater with high efficiency.

Advantageously, the shield area includes a lower shield layer and an upper shield layer formed on the opposite side of the substrate with respect to the lower shield layer, and the shield length $L_{sh}$ is equal to the shield length $LL_{sh}$ of the lower shield layer or the shield length $UL_{sh}$ of the upper shield layer, whichever is bigger.

Favorably, the pole area includes a lower pole layer and an upper pole layer, which magnetically connects to the lower pole layer and is formed on the opposite side of the substrate with respect to the lower pole layer, and the pole length $L_p$ of the pole area is a lower pole length $LL_p$ of the lower pole layer.

Favorably, the heater is formed on the opposite side of the substrate with respect to the magnetic write head element.

Since the heater is placed some distance away from the substrate, the amount of heat that is absorbed and emit by the substrate, is reduced. Therefore the heat evolved by the heater is utilized for the TPTP phenomena effectively. As the result, electrical current applied to the hater to get the desired protrusion of the magnetic head element can be reduced. Consequently, amount of the heat propagated to the MR effect layer is reduced so that reading performance is maintained.

Advantageously, the heater is formed on the opposite side of the PTR surface of the magnetic write head element and the magnetic read head element.

By placing the heater to the above-mentioned location, the heater mainly heats the area of the overcoat layer, where is the opposite side of the PTR surface. The area is expanded by the heat, and this expansion push both the magnetic write head element and the magnetic read head element into the direction of the PTR surface effectively. As the result, electrical current applied to the hater to get the desired protrusion of the magnetic head element can be reduced. Consequently, amount of the heat propagated to the MR effect layer is reduced so that reading performance is maintained.

Favorably, the magnetic read head element is a giant magnetoresistive effect element or a tunnel magnetoresistive effect element. These elements have high sensitivity to magnetic field, but its output is strongly affected by temperature. To use these elements for the magnetic read head element of the thin-film magnetic head according to the invention makes it possible to utilize high sensitivity to magnetic field that these elements have, without degrading the reading performance by the temperature rise.

According to the invention, a head gimbal assembly includes the thin-film magnetic head, a signal line to the magnetic read head element and the magnetic write head element, a conductive lead to flow the electrical current to the heater and a support means for supporting the thin-film magnetic head.

According to the invention, a magnetic disk drive apparatus includes the head gimbal assembly and a control means for controlling the electrical current applied to the heater.

Advantageously, the control means provides electrical current to the heater while the magnetic read head element or the magnetic write head element is in operation.

Favorably, the control means provide electrical current to the heater independent on the operation of the magnetic read head element and the magnetic write head element. Thus, it is possible to use wide variety of heat operation mode other than the mode, which is in conjunction with the read/write operation.

Favorably, the control means includes a sensing means for sensing the acoustic emission included in the read data from the magnetic read head element, and controls the electrical current applied to the heater depend on the amount of acoustic emission sensed. By monitoring the acoustic emission, it is possible to detect the degree and frequency of contact between the thin-film magnetic head and the magnetic disk surface. Therefore by controlling electrical current applied to the heater based on acoustic emission, TPTP phenomena is controllable, and it is possible to avoid the crash the thin-film magnetic head into the magnetic disk.

Favorably, the control means includes a thermal sensor for sensing the temperature inside of the magnetic disk drive apparatus, and controls the electrical current applied to the heater depend on the temperature detected by the thermal sensor. Normally, the magnetic spacing $d_{MS}$ depends on the temperature inside of the apparatus. By controlling the electrical current applied to the heater based on the sensed temperature, it is possible to keep the magnetic spacing $d_{MS}$ constant so that writing and reading performance are stable.

BRIEF DESCRIPTION OF THE DRAWINGS

FIG. 10 shows a C-C line sectional view of FIG. 6;

FIG. 12 shows a block diagram illustrating an example of a read/write circuit of the magnetic disk drive apparatus in the embodiment shown in FIG. 1;

DESCRIPTION OF THE PREFERRED EMBODIMENTS

Figure 1:
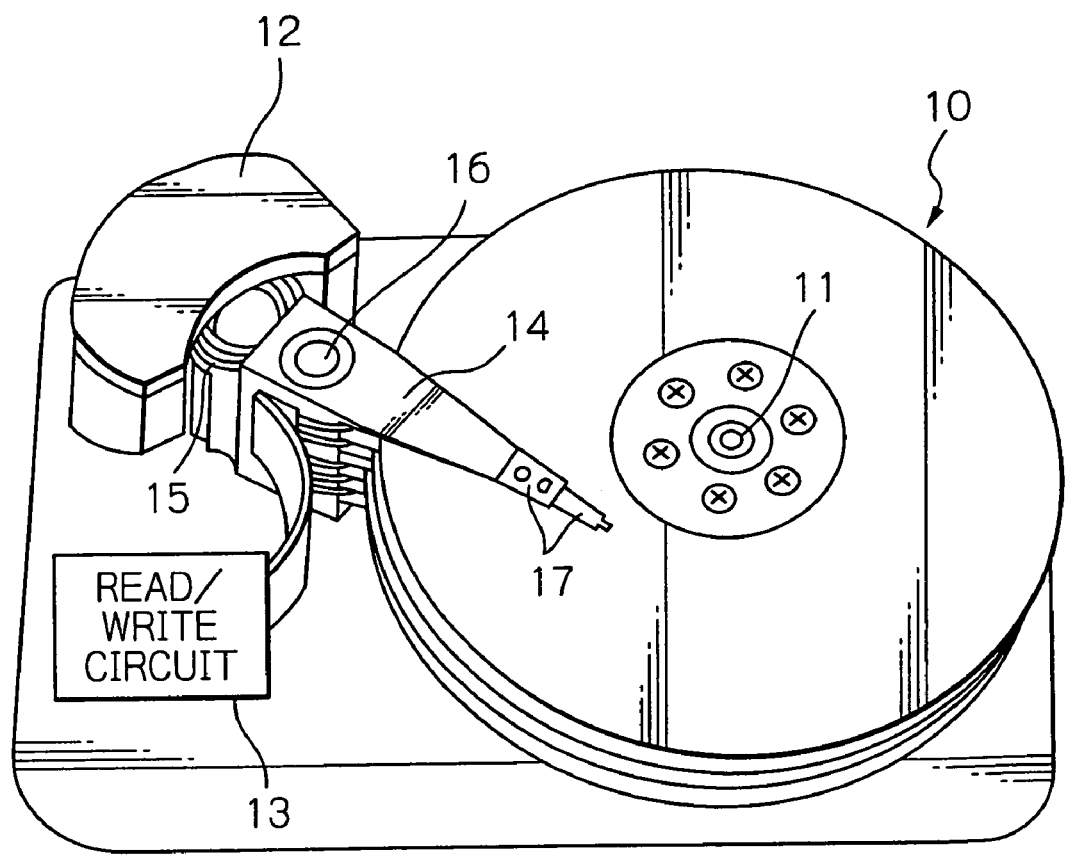
FIG. 1 shows an oblique view schematically illustrating main components of a magnetic disk drive apparatus of the present invention.
Figure 2:
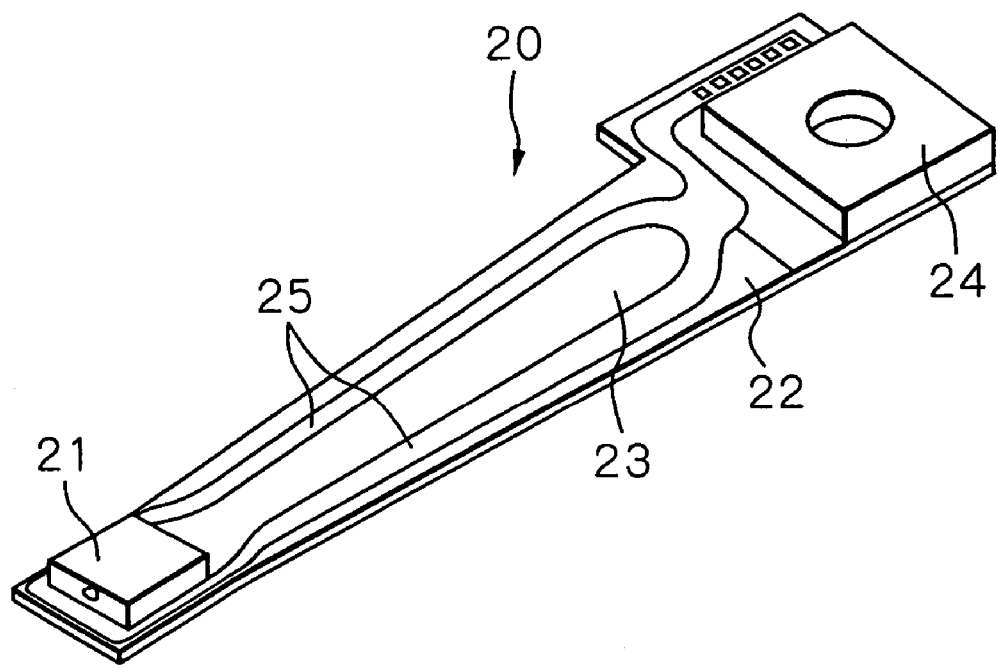
FIG. 2 shows an oblique view illustrating the whole of a HGA in FIG. 1.
Figure 3:
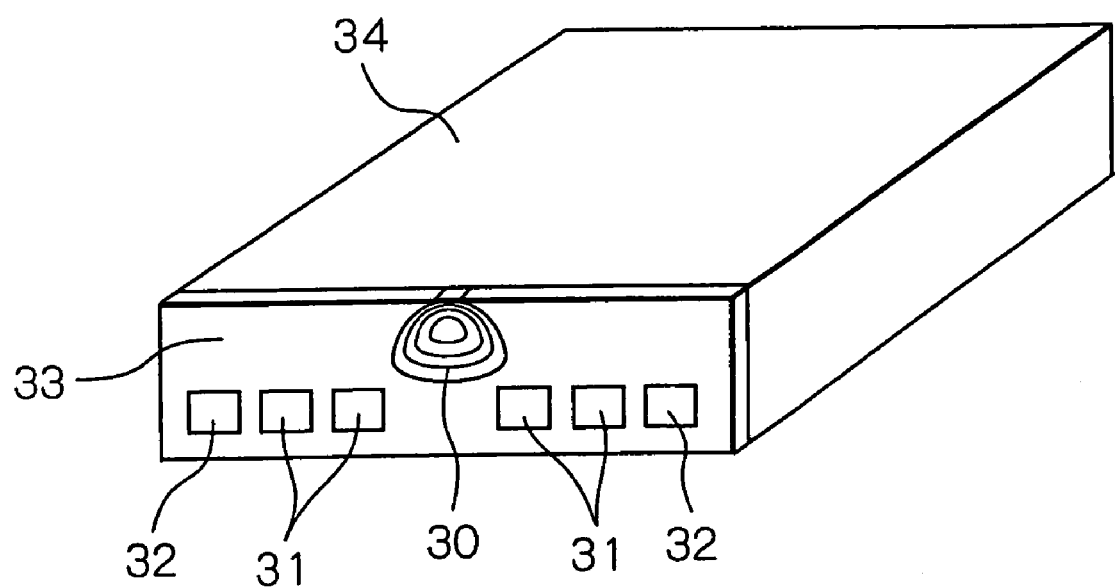
FIG. 3 shows an oblique view illustrating a thin-film magnetic head fixed at a top end section of the HGA in FIG. 1.

FIG. 1 schematically illustrates main components of a magnetic disk drive apparatus in a first embodiment of the present invention, FIG. 2 illustrates the whole of a HGA in the first embodiment, and FIG. 3 illustrates a thin-film magnetic head or slider fixed at a top end section of the HGA in the first embodiment.

In FIG. 1, reference numeral 10 denotes a plurality of magnetic disks rotating around an axis 11, 12 denotes an assembly carriage device for positioning each thin-film magnetic head or slider on a track of each disk, and 13 denotes a read/write circuit for controlling read, write and heat operations of the thin-film magnetic head, respectively.

The assembly carriage device 12 has a plurality of drive arms 14 stacked along an axis 16. These drive arms 14 are capable of rotating around the axis 16 and driven by a voice coil motor (VCM) 15. A HGA 17 is mounted on a top section of each arm 14. Each HGA 17 has a slider mounted at its top end section so that the slider opposes to one surface (recording and reproducing surface) of each magnetic disk 10. In modifications, a single magnetic disk 10, a single drive arm 14, a single HGA 17 and a single thin-film magnetic head or slider may be provided.

As shown in FIG. 2, the HGA is assembled by fixing a slider 21 having magnetic head elements to a top end section of a suspension 20, and by electrically connecting one ends of trace conductors to terminal electrodes of the slider 21.

The suspension 20 is substantially constituted by a load beam 22, a resilient flexure 23 fixed on the load beam 22, a base plate 24 formed at a base end section of the load beam 22, and a lead conductor member 25 fixed on the flexure 23 and provided with trace conductors and connection pads electrically connected both ends of the trace conductors.

A structure the suspension of the HGA according to the present invention is not limited to the aforementioned structure. Furthermore, although it is not shown, a head drive IC chip may be mounted on a middle of the suspension 20.

As shown in FIG. 3, the slider in this embodiment has, on its element-forming surface 33, a magnetic write head element and a magnetic read head element 30 laminated each other, four signal electrode terminals 31 electrically connected to these elements and two heating current electrode terminals 32 electrically connected to a heater (not shown in FIG. 3). In this figure, reference numeral 34 denotes an ABS of the slider. The number of the electrode terminal 32 and its position are not limited to the one shown in FIG. 3, for example, five electrode terminals 32 are possible using the slider substrate as the ground.

Figure 4:
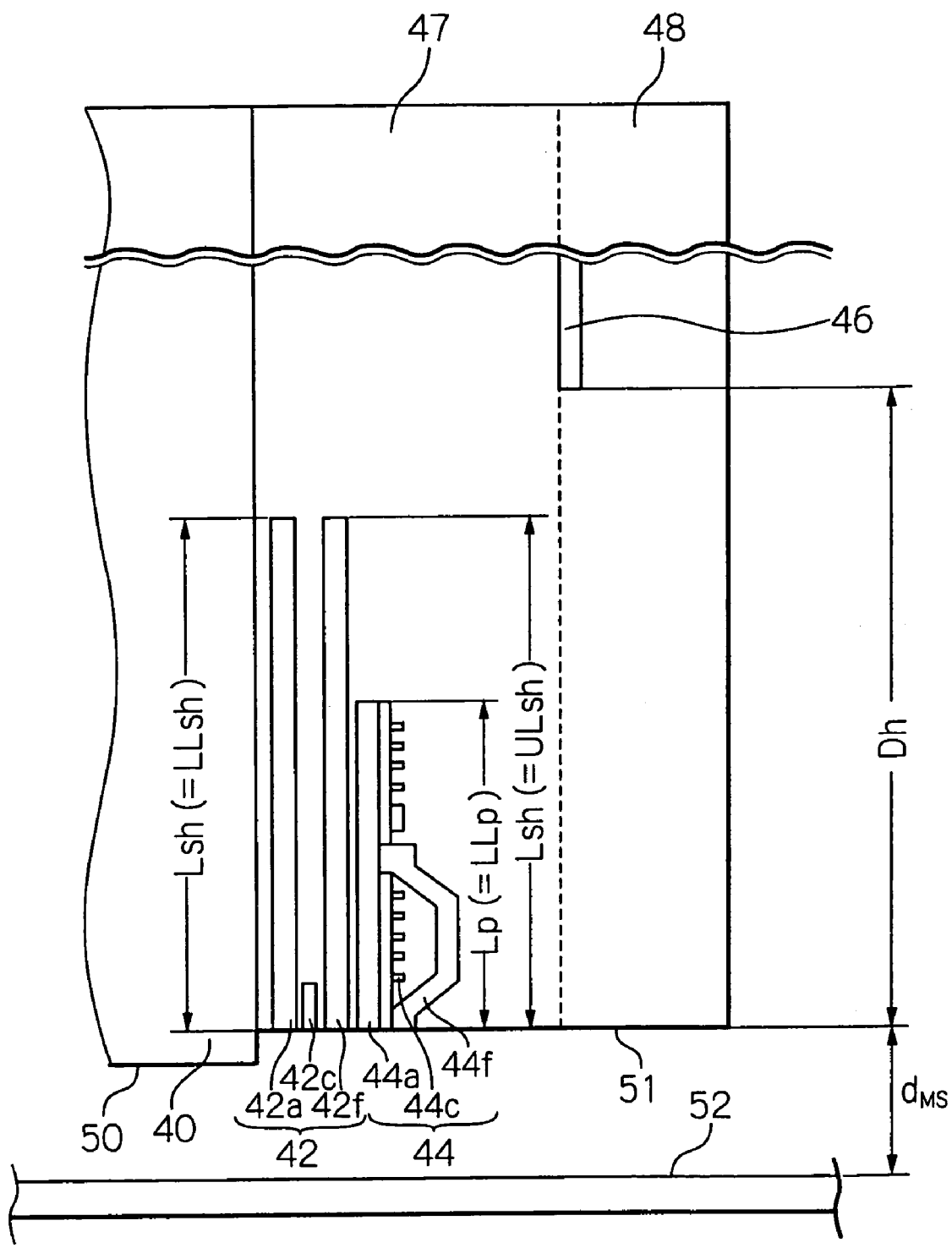
FIG. 4 schematically shows the thin-film magnetic head in a first embodiment of the present invention.

FIG. 4 schematically shows the thin-film magnetic head in a first embodiment of the present invention.

In FIG. 4, a slider substrate 40 has an ABS 50, and aerodynamically flies above a rotating magnetic disk surface 52 during read or write operation. A MR read head element 42, an inductive write head element 44 and an overcoat layer 47 that covers these elements are formed in one side surface (element-formed surface) of the slider substrate 40, where ABS 50 of the slider substrate 40 is as its bottom surface.

The MR read head element 42 includes a MR effect layer 42c interposed between a lower shield layer 42a and an upper shield layer 42f. The MR effect layer 42c is made of CIP-GMR (Current In Plain-Giant ManetoResistive) multiple layered film, CPP-GMR (Current Perpendicular to Plain-GMR) multiple layered film or TMR (Tunnel MagnetoResistive) multiple layered film, and senses magnetic field with very high sensitivity. The lower shield layer 42a and the upper shield layer 42f are magnetic layers, and shields the external magnetic field which causes noise to the MR effect layer 42c. The inductive write head element 44 includes a lower pole layer 44a, an upper pole layer 44f and a coil layer 44c. The lower pole layer 44a and the upper pole layer 44f are magnetic paths to converge and lead a magnetic flux generated from the coil layer 44c to the magnetic disk surface 52, while write operation is performed.

One end of the MR read head element 42 and the inductive write head element 44, which is closer to the magnetic disk surface 52, reaches to a pole tip recess (PTR) surface 51. This PTR surface 51 is coated by for example diamond like carbon (DLC) serving as protection film. The distance between the PTR surface 51 and the magnetic disk surface 52, while in operation, is a magnetic spacing $d_{MS}$.

A heater 46 is formed on the overcoat layer 47. That is to say, the heater 46 is formed on the opposite side of the slider substrate 40 with respect to the MR read head element 42 and the inductive write head element 44. Also an overcoat layer 48 is formed on the overcoat layer 47 covering the heater 46. The heater 46 can be placed at an area in the overcoat layer 47, where the area is at the opposite side of the ABS of the thin-film magnetic head.

In this embodiment, the lower shield layer length $LL_{sh}$ and the upper shield layer length $UL_{sh}$ are equal. Here, a shield length $L_{sh}$ is defined as the lower shield layer length or upper shield layer length, that is $L_{sh}=LL_{sh}=UL_{sh}$. Also pole length $L_p$ of the inductive write head element is defined as a lower pole layer length $LL_p$. The shield length $L_{sh}$ is set to satisfy following relation as will hereinafter be described. $D_h \geq L_{sh}$, where $D_h$ is the distance from the PTR surface 51 to the heater 46.

Favorably, the shield length $L_{sh}$ is set to satisfy following relation.

$$D_h \geq L_{sh} \geq L_p$$

If the lower shield layer length $LL_{sh}$ is not equal to the upper shield layer length $UL_{sh}$, the bigger value is used as the shield length $L_{sh}$.

Figure 5:
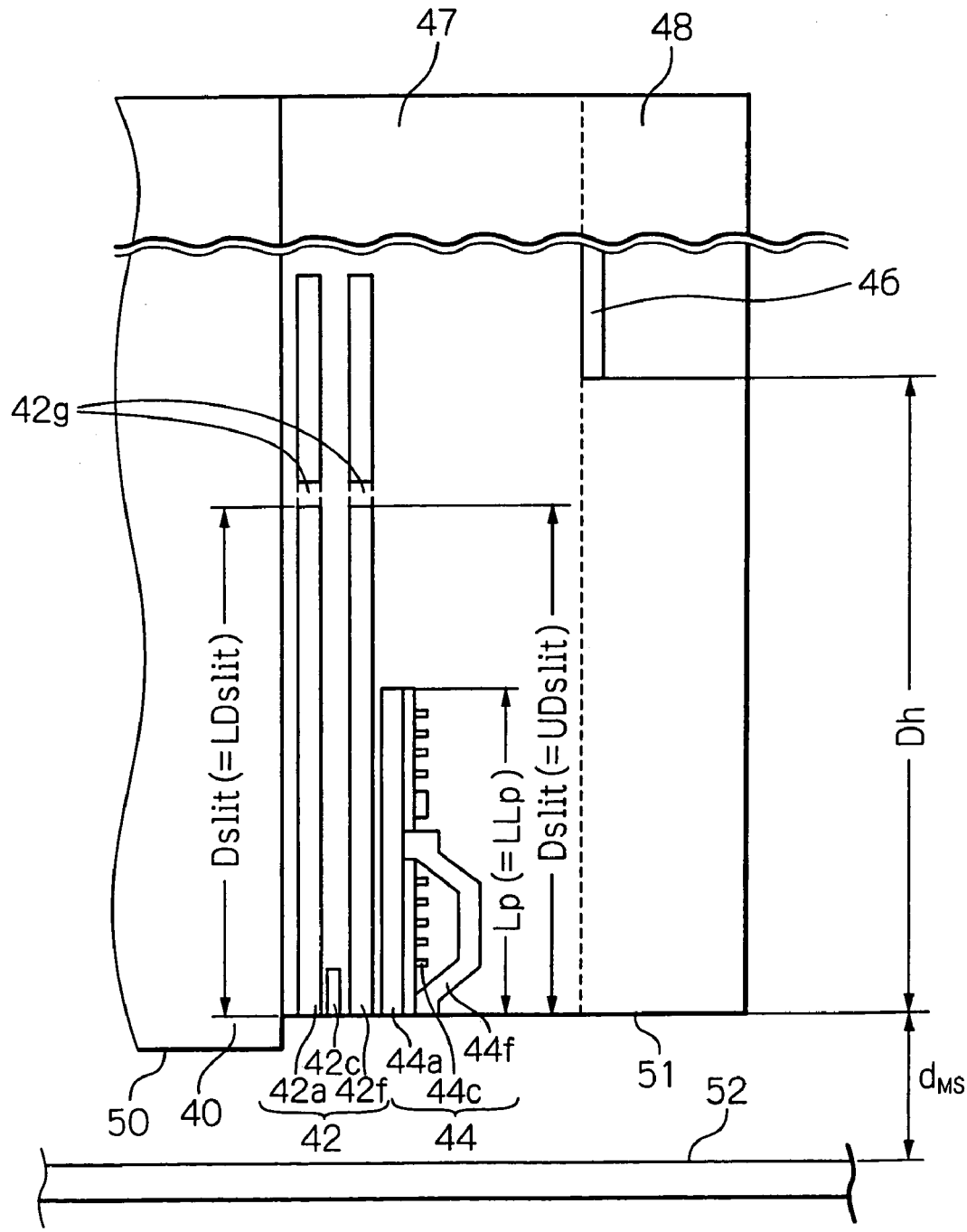
FIG. 5 schematically shows the thin-film magnetic head in a second embodiment of the present invention.

FIG. 5 schematically shows the thin-film magnetic head in a second embodiment of the present invention.

In the second embodiment show in FIG. 5, a slit area 42g, which is made of the lower thermal conductivity material than the lower shield layer 42a and the upper shield layer 42f, for example, heat insulating material, is formed to split each shield layer. The slit area 42g resist the propagation of heat, which is evolved by the heater 46, to the MR effect layer 42c via lower shield layer 42a or upper shield layer 42f. Thus, it suppresses the temperature rise of the MR effect layer 42c. Regarding as other parts, like the MR effect layer 42c, the inductive write head element 44, the heater 46 and the overcoat layer 47 are the same as the first embodiment shown in FIG. 4.

In this embodiment, the distance $LD_{slit}$, which is the distance from the PTR surface 51 to the slit area 42g of the lower shield layer 42a, is equal to the distance $UD_{slit}$, which is the distance from the PTR surface 51 to the slit area 42g of the upper shield layer 42f. Here, distance $D_{slit}$ is defined as equal to $LD_{slit}(=UD_{slit})$. Also pole length $L_p$ of the inductive write head element is defined as a lower pole layer length $LL_p$. The $D_{slit}$ is set to satisfy following relation as will hereinafter be described.

$D_h \geq D_{slit}$, where $D_h$ is the distance from the PTR surface 51 to the heater 46.

Favorably, the $D_{slit}$ is set to satisfy following relation.

$$D_h \geq D_{slit} \geq L_p$$

Figure 6:
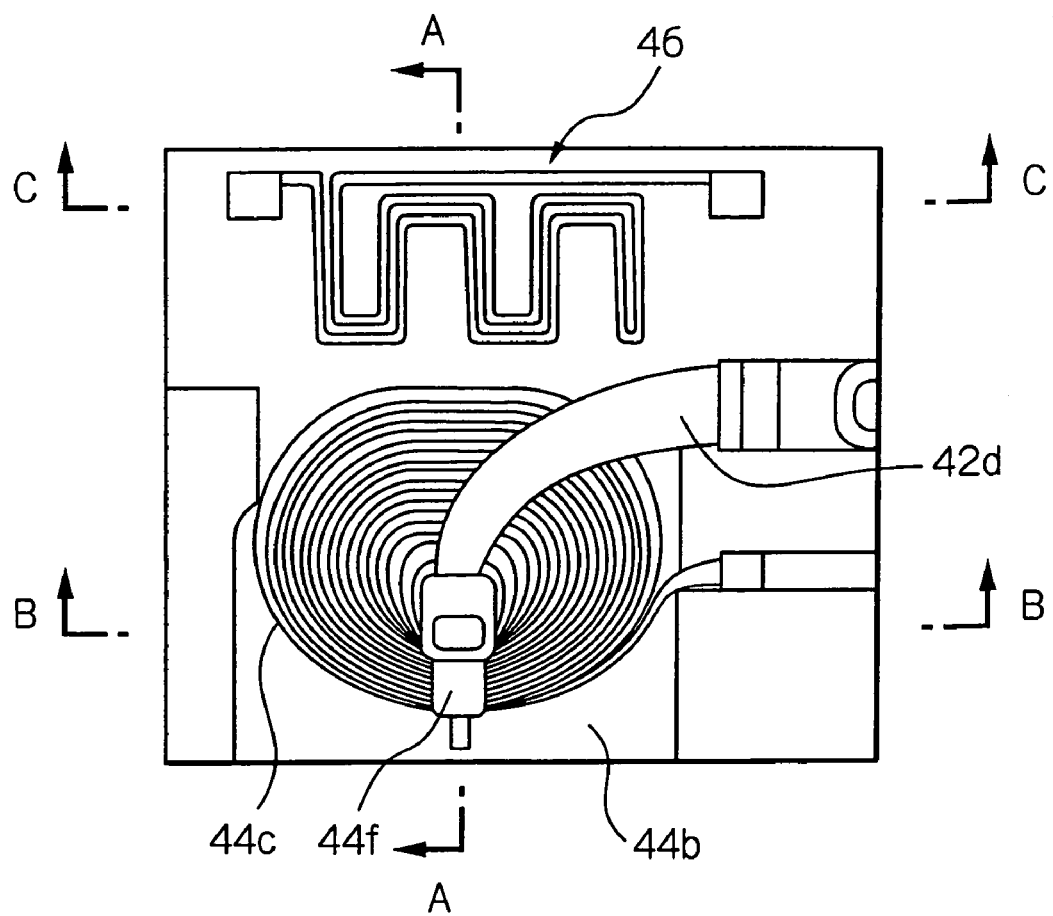
FIG. 6 shows a perspective plane view illustrating the thin-film magnetic head in the first and the second embodiment, seen from an element-formed side on a slider substrate.
Figure 7:
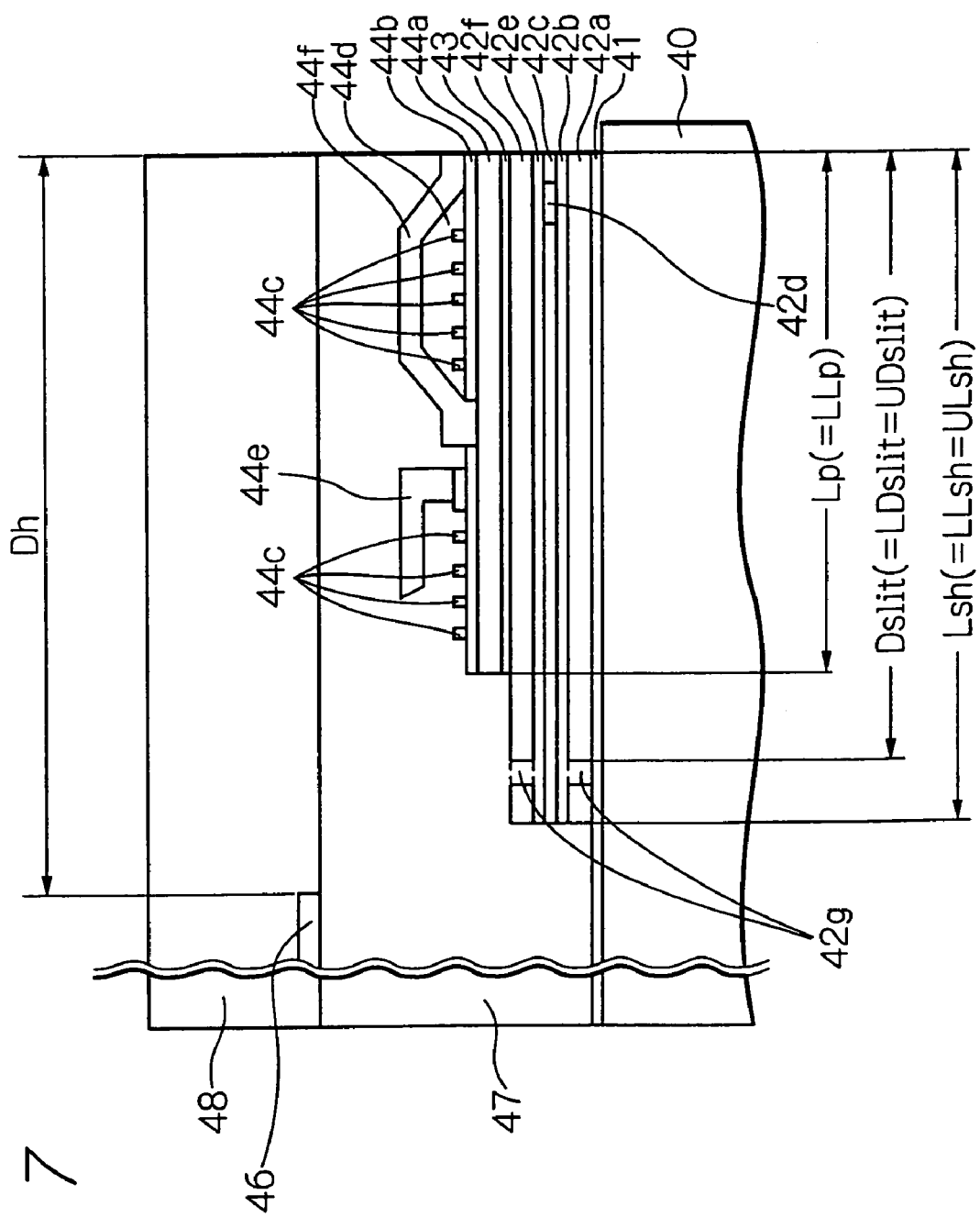
FIG. 7 shows an A-A line sectional view of FIG. 6.
Figure 8:
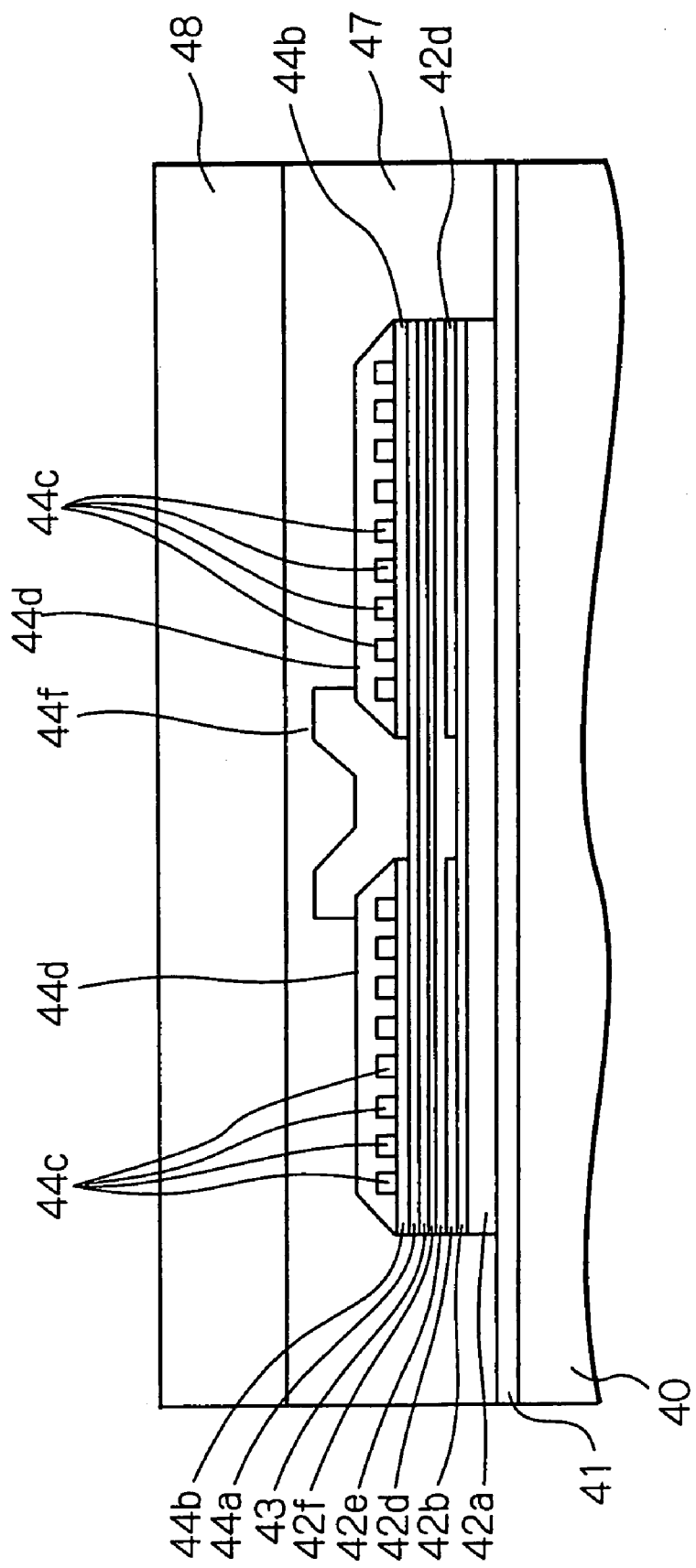
FIG. 8 shows a B-B line sectional view of FIG. 6.

In the next place, the thin-film magnetic head according to the first and second embodiments are described in more detail. FIG. 6 shows a perspective plane view illustrating the thin-film magnetic head in the first and the second embodiment, seen from an element-formed side on a slider substrate, FIG. 7 shows an A-A line sectional view of FIG. 6, and FIG. 8 shows a B-B line sectional view of FIG. 6. In order to simplify the figure, the number of turns of coil indicated in FIG. 7 is smaller than that of FIG. 6. The coil may be two layered or helical coil. In order to simplify the figure, the heater 46 shown in FIG. 6 and FIG. 7 are also simplified.

In FIG. 7, reference numeral 40 denotes the slider substrate made of for example an AlTiC ($Al_2O_3$—TiC), 41 denotes an insulation layer, which is about 0.5 um to 10 um in thickness, laminated on the slider substrate 40, made of for example $Al_2O_3$, 42a denotes the lower shield layer, which is about 0.3 um to 3.0 um in thickness, laminated on the insulation layer 41, and made of for example NiFe, NiFeCo, CoFe, FeN or FeZrN, 42b denotes a lower shield gap layer, which is about 0.005 um to 0.5 um in thickness, laminated on the lower shield layer 42a, and made of for example $Al_2O_3$ or DLC, 42c denotes the MR effect layer such as for example, CIP-GMR multi-layered film CCP-GMR multi-layered film or a TMR multi-layered film, laminated on the lower shield gap layer 42b, 42d denotes element-lead conductor layers made of for example Cu, provided with magnetic bias layers and connected to both ends of the MR effect layer 42c, 42e denotes an upper shield gap layer, which is about 0.005 um to 0.5 um in thickness, laminated on the MR effect layer 42c and the element-lead conductor layers 42d, and made of for example $Al_2O_3$ or DLC, 42f denotes the upper shield layer, which is about 0.3 um to 4 um in thickness, laminated on the upper shield gap layer 42e, and made of for example NiFe, NiFeCo, CoFe, FeN or FeZrN. Read gap length, which is the length between the upper shield layer 42f and the lower shield layer 42a, is about 0.03 um to 1 um.

In the second embodiment, the slit area 42g is provided for both the upper shield layer 42f and the lower shield layer 42a. The slit area 42g for the lower shield layer 42a is about 2 um to 10 um in length and made of the same material as the lower shield gap layer 42b. The slit area 42g for the upper shield layer 42f is about 2 um to 10 um in length and made of the same material as the overcoat layer 47. It is possible to use other materials as long as it has lower thermal conductivity than the upper shield layer 42f and the lower shield layer 42b.

In the first embodiment, the slit area 42g is not provided.

In FIG. 7, reference numeral 43 denotes an insulation layer, which is about 0.1 um to 2.0 um in thickness, laminated on the upper shield layer 42f, and made of for example $Al_2O_3$, 44a denotes the lower pole layer, which is about 0.3 um to 3.0 um in thickness, laminated on the insulation layer 43, and made of for example NiFe, NiFeCo, CoFe, FeN or FeZrN, 44b denotes an magnetic gap layer, which is about 0.03 um to 0.5 um in thickness corresponding to the write gap length, laminated on the lower pole layer 44a, and made of for example $Al_2O_3$ or DLC, 44c denotes a coil layer, which is about 0.5 um to 3 um in thickness, laminated on the magnetic gap layer 44b, and made of for example Cu, 44d denotes a coil-insulation layer, which is about 0.1 um to 5 um in thickness, formed by for example a thermally cured resist layer to cover the coil layer 44c, 44e denotes a coil-lead conductor layer made of for example Cu or NiFe, and electrically connected to one end of the coil layer 44c, 44f denotes the upper pole layer, which is about 0.5 um to 5 um in thickness, made of for example NiFe, NiFeCo, CoFe, FeN or FeZrN to form, with the lower pole layer 44a, magnetic poles and a magnetic yoke, and 47 denotes the overcoat layer 47 made of for example $Al_2O_3$, respectively. However the insulation layer 43 is not mandatory.

46 denotes the heater laminated on the overcoat layer 47, which covers the upper pole layer 44f. That means the heater 46 is placed on the opposite side of the slider substrate with respect to the MR read head element 42 and the inductive write head element 44. 48 denotes the overcoat layer, which covers the heater 46, made of for example $Al_2O_3$.

FIG. 8 shows a B-B line sectional view of FIG. 6, using the same reference numeral used in FIG. 7 to indicate the same element. In FIG. 7, the MR effect layer 42c, the coil-lead conductor layer 44e, slit area 42g and the heater 46 are not shown, because of B-B line sectional view.

Figure 9:
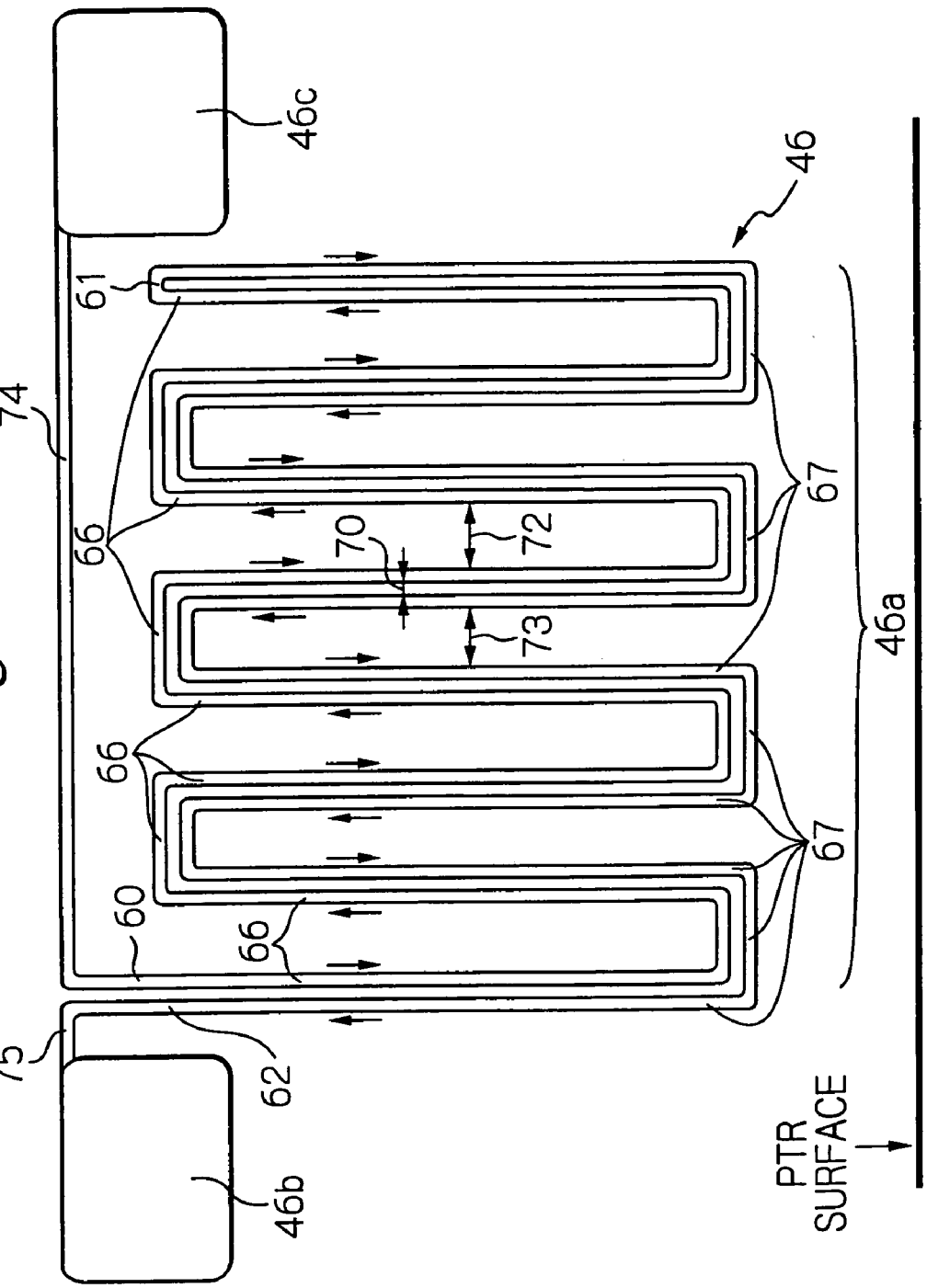
FIG. 9 show structure of the heater of the thin-film magnetic head according to the first and the second embodiment.

FIG. 9 show the structure of the heater 46 of the thin-film magnetic head according to the first and the second embodiment. FIG. 10 shows a C-C line sectional view of FIG. 6, and shows structure of the electrode pad of the heater 46.

As shown in FIG. 9, the heater 46 includes a heating part 46a, which is a meander shaped line in the layer, electrode 46b and 46c that is respectively connected to the one end of the heating part 46a.

For more detail, the heating part 46a has a start point 60, a turning back point 61, an end point 62 placed close to the start point 60, an upward direction part 66 that snakes with rectangular shape from the start point 60 to the turning back point 61, a downward direction part 67 which snakes along with the upward direction part 66 from the turning back point 61 to the end point 62, a connecting part 74 that connects the electrode 46c to the start point 60 and a connecting part 75 that connects the electrode 46b to the end point 62. Distance 70 between the upward direction part 66 and the downward direction part 67 is smaller than distance 72, which is the spacing of the upward direction 66, and distance 73, which is the spacing of the downward direction 67.

The heating part 46a, for example, is about 100 nm to 5000 nm in thickness, and made of the material including NiCu containing Ni for example about 15 to 60 atomic percent, preferably, containing Ni about 25 to 45 atomic percent. The material may contain at least Ta, Al, Mn, Cr, Fe, Mo, Co, Rh, Si, Ir, Pt, Ti, Nb, Zr or Hf as additives, but preferably the additives is less than or equal to 5 atomic percent.

Also the heating part 46a, for example, may be made of the material including NiCr containing Ni for example about 55 to 90 atomic percent, preferably, containing Ni about 70 to 85 atomic percent. The material may contain at least Ta, Al, Mn, Cu, Fe, Mo, Co, Rh, Si, Ir, Pt, Ti, Nb, Zr or Hf as additives, but preferably the additives is less than or equal to 5 atomic percent. The electrode 46b and 46c is made of the same material as the heating part 46a.

As shown in FIG. 10, a conductive base electrode film 80b is formed on the electrode 46b, and a conductive base electrode film 80c is formed on the electrode 46c. The bump 81b and 81c, which use the base electrode film 80b and 80c as the electrode, are respectively formed on the base electrode film 80b and 80c by electroplating, and extend upward. The base electrode film 80b, 80c, bump 81b and bump 81c are made of conductive material like Cu. The thickness of the base electrode film 80b and 80c is about 10 nm to 200 nm, the thickness of the bump 81b and 81c are about 5 um to 30 um.

The top portion of the bump 81b and 81c crop out from the overcoat layer 48, and a pad 82b and 82c for the heater 46 are respectively formed on the top portion of the bump 81b and 81c. The electrical current is provided to the heater 46 via the pad 82b and 82c. Although the MR read head element 42 and the inductive write head element 44 are connected to the signal electrode terminal 31, it is not shown in FIG. 10 for simplification.

FIGS. 11a to 11e show sectional views illustrating parts of a manufacturing process of the thin-film magnetic head according to the first and the second embodiment, and shows an A-A line sectional view of FIG. 6.

Figure 11A:
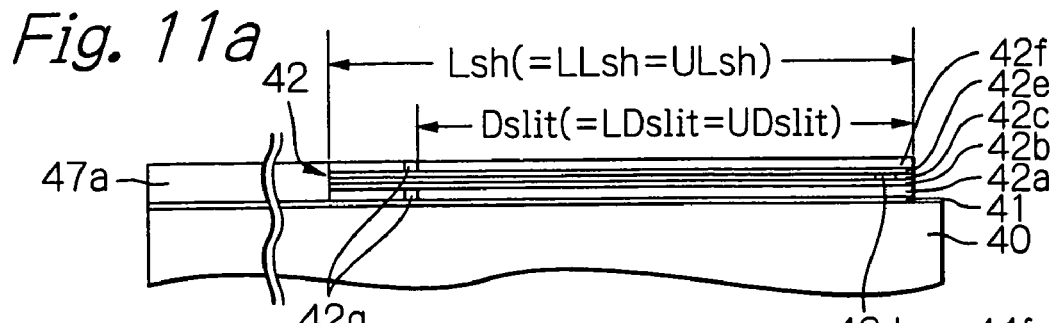
FIGS. 11a to 11e show sectional views illustrating parts of a manufacturing process of the thin-film magnetic head according to the first and the second embodiment.

Hereinafter, the manufacturing process of the thin-film magnetic head in these embodiments will be described in brief using these drawings. First, as shown in FIG. 11a, the insulation layer 41 is formed on the slider substrate 40, for example by way of the sputtering technique. Then, the lower shield layer 42a with the shield length $L_{sh}$ is formed on the insulation layer 41, for example, by way of plating technique.

In case of the second embodiment, a gap is formed to the lower shield layer 42a at the point, where is the distance $D_{slit}$ away from the PTR surface 51, by way of the known method like, photolithographic or dry etching. In the first embodiment, this step is not required.

Next, the lower shield gap layer 42b is formed, for example by way of the sputtering technique. In case of the second embodiment, the slit area 42g is also formed in this step by inserting the same material of the lower shield gap layer 42b to the gap made in the previous step. And then, the MR effect layer 42c, the element-lead conductor layers 42d provided with the magnetic bias layers and the upper shield gap layer 42e are formed, for example by way of the sputtering technique. Then, the upper shield layer 42f with the shield length $L_{sh}$ is formed, for example by way of plating technique.

In case of the second embodiment, a gap is formed to the upper shield layer 42f at the point, where is the distance $D_{slit}$ away from the PTR surface 51, by way of the known method like, photolithographic or dry etching. In the first embodiment, this step is not required.

Next, a planarizing layer 47a is formed opposite side of the PTR surface 51. In case of the second embodiment, the slit area 42g is also formed in this step by inserting the same material of the planarizing layer 47a to the gap made in the previous step. The MR read head element 42 is completed by the steps mentioned above.

Figure 11B:
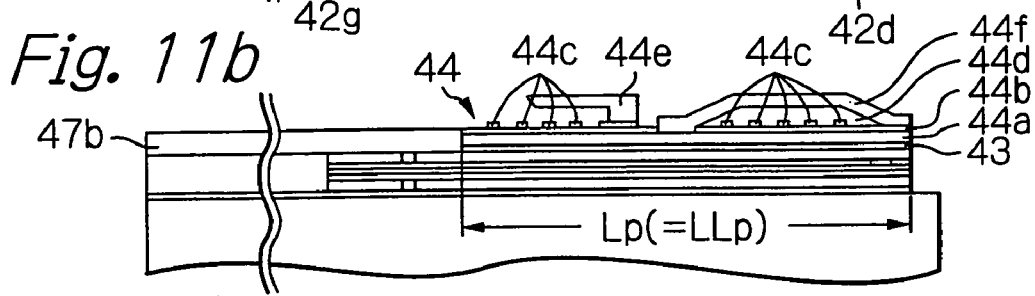
Figure 11C:
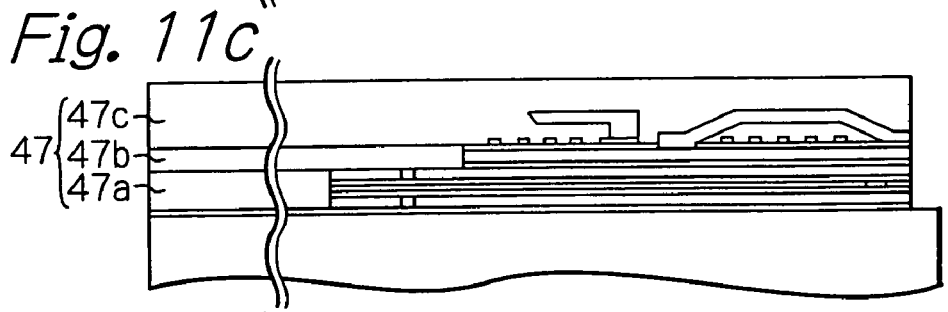
Figure 11D:
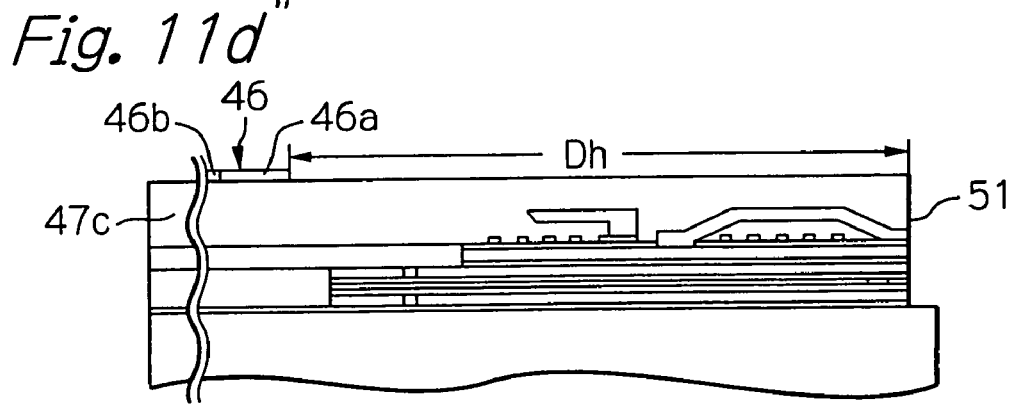

Next, as shown in FIG. 11b, the insulation layer 43, the lower pole layer 44a with the pole length $L_p$ and the magnetic gap layer 44b are formed on the upper shield layer 42f, for example by way of sputtering technique, and a planarizing layer 47b is formed at opposite side of the PTR surface 51. Then, the coil layer 44c is formed on the magnetic gap layer 44b, by way of the known method like photolithographic or dry etching, and the coil-insulation layer 44d and the upper pole layer 44f are formed, and covers the coil layer 44c. The inductive write head element 44 is completed by the steps mentioned above. Then, before forming the heater 46, a planarized overcoat layer 47c is formed as shown in FIG. 11c.

Figure 11E:
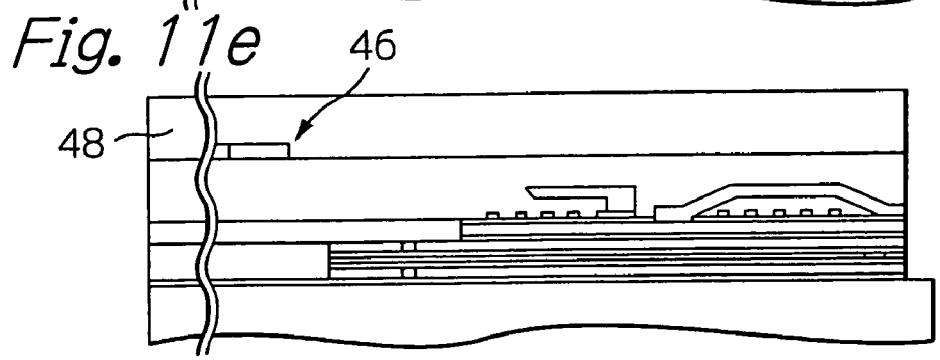

Then, the heating part 46a, electrode 46b and 46c of the heater 46 are formed on the planarized overcoat layer 47c. The heater 46 is formed at the point, where distance from the PTR surface 51 to the nearest point to the PTR surface 51 of the heater 46 is $D_h$. Finally, the overcoat layer 48 is formed to cover the heater 46 as shown in FIG. 11e.

Figure 13:
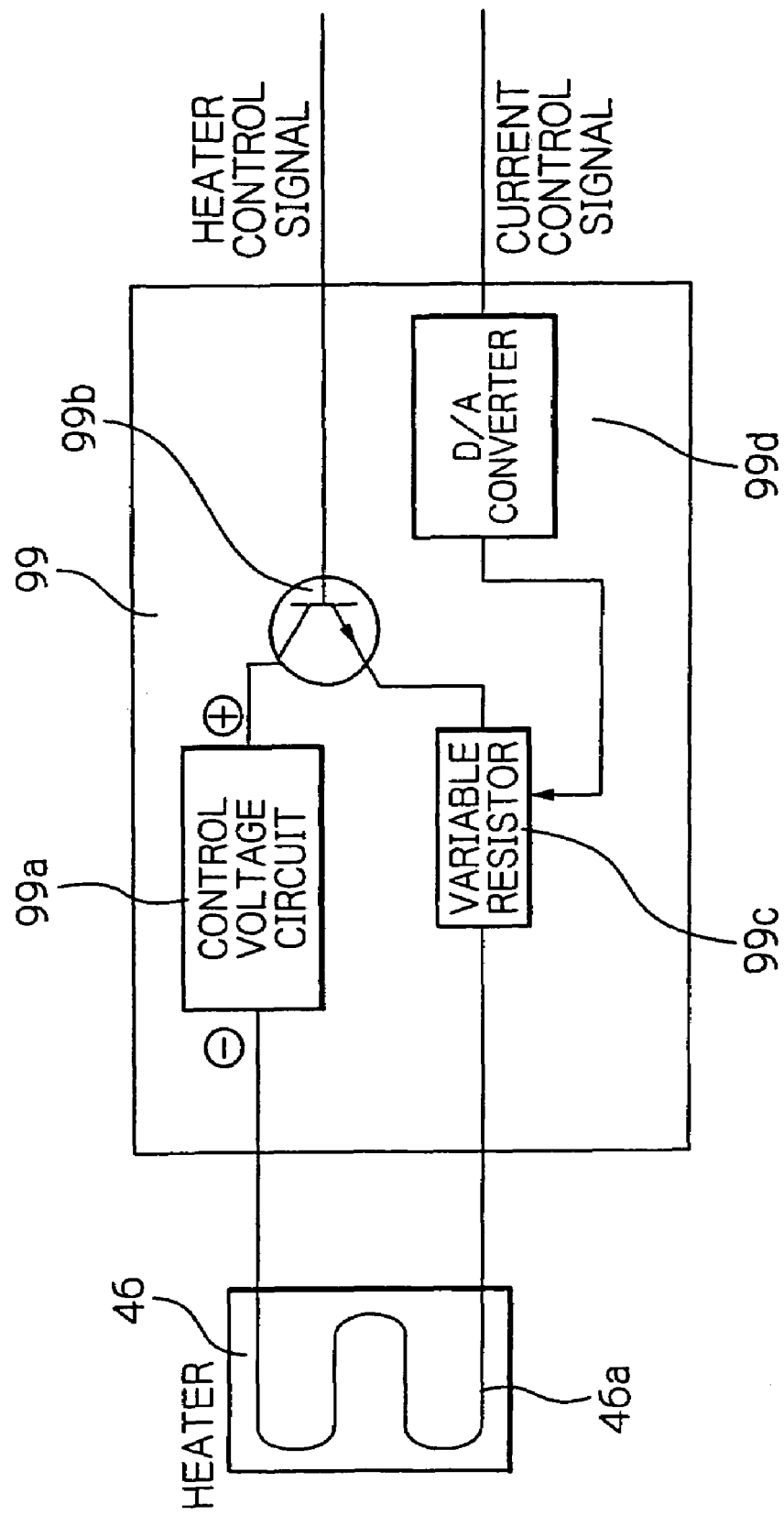
FIG. 13 shows a block diagram illustrating an example of a heater control circuit in the embodiment shown in FIG. 1.

FIG. 12 shows a block diagram illustrating an example of a read/write circuit of the magnetic disk drive apparatus in the embodiment shown in FIG. 1, and FIG. 13 shows a block diagram illustrating an example of a heater control circuit in the embodiment shown in FIG. 1.

In FIG. 12, reference numeral 90 denotes a read-write control LSI (Large Scale Integration) including a thermal asperity (TA) sensing circuit 90a. 91 denotes a write gate for receiving write data from the read-write control LSI 90, 92 denotes a write circuit, 93 denotes a ROM (Read Only Memory) for storing data for controlling electrical current applied to the heater 46, 95 denotes a constant current circuit for supplying a constant sense current to the MR read head element 42, 96 denotes an amplifier for amplifying output voltage from the MR read head element 42, 97 denotes a demodulator circuit for providing read data to the read-write control LSI 90, 98 denotes a thermal sensor and 99 denotes a heater control circuit of the heater 46.

Write data output by the read-write control LSI 90 is supplied to the write gate 90. The write gate 90 supplies the write data to the write circuit 92 only when the write control signal from the read-write control LSI 90 indicates to perform write operations. The write circuit 92 generates write current to flow through the coil layer 44c for the write data, and thus magnetic recording on the magnetic disk 10 (FIG. 1) by the inductive write head element 44 is performed.

The constant current circuit 95 supplies a constant sense current to the MR effect layer 42c only when the read control signal provided by the read-write control LSI 90 indicates to execute read operations. Signals reproduced by the MR read head element 42 is amplified at the amplifier 96, then demodulated at the demodulation circuit 97 and output to the read-write control LSI 90.

FIG. 13 shows the heater control circuit 99 in this embodiment. A constant voltage circuit 99a, a switching transistor 99b and variable resistor 99c are connected in series to the heating part 46a of the heater 46. The heater control signal is provided to the switching transistor 99b from the read-write control LSI 90. Also the current control signal output by the read-write control LSI 90 is converted to the analog signal at a digital to analog converter 99d, and fed to the variable resistor 99c.

When the heater control signal indicates heat operation, the switching transistor 99b turns on to flow electrical current through the heating part 46a of the heater 46. The electrical current is controlled by the variable resistor 99c, which value is controlled by the current control signal.

As just described, by providing the heater control signal and the current control signal, both of which are independent on the read/write system, makes it possible a variety of heat operation mode other than the one that applies the electrical current to the heater 46 in conjunction with read/write operation.

During the heat operation, electrical current is applied to the heating part 46a of the heater 46 in accordance with selected heat operation mode. By the electrical current, the heater 46 as well as the its surrounding area are heated to produce a thermal expansion resulting that the inductive write head element 44 and the MR read head element 42 are slightly jut or protrude to the PTR surface 51. Thus, a magnetic spacing $d_{MS}$ can be reduced only during write operation and read operation. Because the magnetic spacing $d_{MS}$ is reduced only when the write and/or read head elements are operated, it is possible to compensate decreasing in the signal recording ability and/or the signal reproducing ability due to narrowed track width without significantly increasing the probability of occurrence of collision between the slider and the magnetic disk surface. The magnetic spacing $d_{MS}$ can be precisely adjusted by controlling the electrical current applied to the heating part 46a using current control signal.

It is apparent that the circuit configuration of the read/write circuit 13 is not limited to the one shown in FIG. 11 and FIG.

12. The write operation and the read operation may be specified signals other than the write control signal and the read control signal, respectively. It is desired that the heater 46 is energized during both write operation and read operation as aforementioned. However, the heater 46 may be energized only during write operation, read operation, or certain period in case of the intermittent read/write operations. Furthermore, it is possible to use alternating current or pulsed current as well as the direct current.

One embodiment of the heat operation mode will be described hereinafter.

First of all, Initial setting of the electrical power applied to the heater 46, which controls the magnetic spacing $d_{MS}$, is described. The values of the magnetic spacing $d_{MS}$ of individual thin-film magnetic heads are normally not the same. Therefore the value of AE (Acoustic Emission) in the read data is sensed by the TA sensing circuit 90a at the most inner track of a magnetic disk, increasing the electrical current applied to the heater 46 until the value of AE exceeds the predetermined value, and determines the limit current value. This limit current value is recorded in the ROM 93. The reason of using the most inner track is the magnetic spacing $d_{MS}$ is the smallest at the most inner track during the seek operation, therefore it can be used as upper limit of the electrical current. Then value of electrical current, which makes the magnetic spacing $d_{MS}$ desired value, is determined using the commonly used table stored in the ROM 93, showing the relation between electrical current and TRTP protrusion.

Next, applying electrical power to the heater 46 during the normal operation is described. First, read or write operation is done with applying the electrical current determined in the initial setting described above to the heater 46. As long as the amount of generated AE is within normal limit, read/write operation goes without change. If the amount of generated AE is out of normal limit, then, the electrical current applied to the heater 46 is decreased by predetermined amount, and monitors the generated AE. This step is repeated. If the amount of generated AE is still out of normal limit after repeating predetermined times, it is considered as unstable situation of the flying slider or warning of the crash, therefore signal, which for example indicate the stopping operation is sent to the host CPU.

Next, thermal compensation of the magnetic spacing $d_{MS}$ is described. Because the slider aerodynamically flies, the magnetic spacing $d_{MS}$ depends on the temperature inside of an apparatus. Also protrusion of the magnetic head element by the TPTP phenomenon depends on the temperature inside of an apparatus. Consequently, table, showing the relation between temperature inside of an apparatus and variation of the magnetic spacing $d_{MS}$ based on the characteristics of the thermal sensor 98 and the amount of the TPTP protrusion, is stored in the ROM 93, and monitors the temperature using the thermal sensor 98. The magnetic spacing $d_{MS}$ is kept constant by changing the electrical current based on the temperature inside of an apparatus and the table.

Next, other compensation of the magnetic spacing $d_{MS}$ is described. The magnetic spacing $d_{MS}$ also depends on the air pressure change and vibration. However, normally the pneumatic sensor and vibration sensor is not installed in the magnetic disk drive apparatus. Therefore, adjustment of the magnetic spacing $d_{MS}$ is first performed based on the temperature inside of an apparatus. After this adjustment, if the amount of generated AE is out of the normal limit, it is considered as the variation caused by the air pressure change or vibration, and then, the electrical current applied to the heater 46 is decreased by a first predetermined amount. If the amount of generated AE is still out of normal limit, the electrical current applied to the heater 46 is decreased by a second predetermined amount. This step is repeated. If the amount of generated AE is still out of normal limit after repeating predetermined times, it is considered as unstable situation of the flying slider or warning of the crash, therefore signal, which for example indicate the stopping operation is sent to the host CPU.

Furthermore, the magnetic spacing $d_{MS}$ depends on the position relative to the magnetic disk. Because the speed of the disk is a function of a radius on the condition that number of rotation is constant. Therefore it is possible to keep the magnetic spacing $d_{MS}$ constant by adjusting the value of electrical current applied to the heater 46 depends on the radius, while reading or writing is performed.

For the use in the in-vehicle apparatus, like car navigation system, it is possible to provide the strong vibration mode (frequently generated AE mode), which uses smaller electrical current to make the magnetic spacing $d_{MS}$ large enough.

Next, the effect of shield length $L_{sh}$ and the position of the slit area 42g provided in the shield layer against the TPTP phenomenon caused by the heater 46 is described.

In FIG. 4 and FIG. 5, the heater 46 is heated by electrical current, and provides the heat to/around the overcoat layer 47 and 48. Consequently, the overcoat layer 47 and 48 accumulates the heat, and expands depends on its thermal distribution. The MR read head element 42 and inductive write head element 44 are pushed out of the way to the magnetic disk surface 52 by this thermal expansion, and the magnetic spacing $d_{MS}$ is shortened because of protrusion of the PTR surface 51. The decreased length of the magnetic spacing $d_{MS}$ is controllable by the electrical current applied to the heater 46.

The heat caused by the heater 46 is propagated to the upper shield layer 42f, lower shield layer 42a, lower pole layer 44a and upper pole layer 44f, where the amount of heat propagated to each layer depends on position relation between each layer and the heater 46. As mentioned above, because shield layers and pole layers are normally made of metals, like NiFe, thermal conductivity of the shield layers and pole layers are higher than the overcoat layer that is made of the insulating material. Therefore, for example, the heat propagated to the lower shield layer 42a and the upper shield layer 42f from the heater 46 is easily propagated to the MR effect layer 42c, which is sandwiched between both shield layers. If amount of the heat propagated to the MR effect layer 42c increases, the temperature of the MR effect layer 42c may exceeds above the allowable maximum, as the result, reading performance of the MR read head element 42 degrades.

To prevent such a degradation of the reading performance, according to the first embodiment shown in FIG. 4, both shield length $L_{sh}$ are controlled against the distance $D_h$ from the PTR surface 51 to the heater 46. That is, since amount of the heat, which the lower shield layer 42a and the upper shield layer 42f are received from the heater 46, varies in accordance with the positional relation between both shield layers and the heater 46, it is possible to limit the amount of heat, which both shield layer are received, by adjusting the relation of shield length $L_{sh}$ and distance $D_h$, which indicates the position of the heater 46.

Furthermore, according to the second embodiment shown in FIG. 5, the slit area 42g are provided to the shield layer, and distance $D_{slit}$ from the PTR surface 51 to the slit area 42g is adjusted against distance $D_h$. That is, the slit area 42g provided to the each shield layer resists against the heat propagation in the shield layer, and limits the amount of heat, which reaches to the MR effect layer 42c. Because the amount of heat propagated to the MR effect layer 42c varies depends on the position of the slit area 42g provided to the shield layer, it is possible to limit the amount of heat propagated to the MR effect layer by adjusting the relation between $D_{slit}$, which indicates position of the slit area 42g, and $D_h$, which indicates position of the heater 46.

Figure 14:
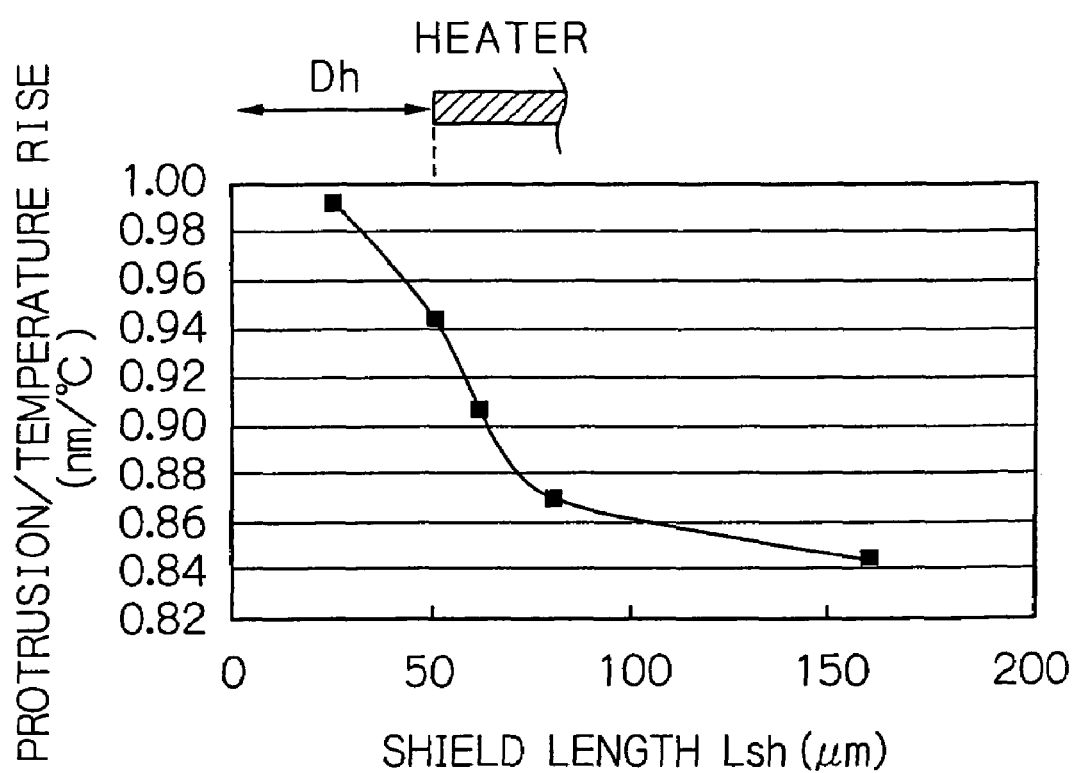
FIG. 14 shows the relation between shield length $L_{sh}$ of the MR read head element and "protrusion/temperature rise" according to the first embodiment.

FIG. 14 shows the relation between shield length $L_{sh}$ of the thin-film magnetic head and ratio of protrusion to temperature rise according to the first embodiment. Vertical axis shows the amount of "protrusion (nm)/temperature rise (degrees C.)", and shows simulation result. Big value of "protrusion/temperature rise" means big protrusion is occurred with a little amount of the heat, therefore thermal efficiency of the TPTP phenomena is high. Here, electrical power supplied to the heater 46 is 100 mw, length $D_h$ is 50.0 um, and pole length $L_p$ of the lower pole layer 44a is 25.0 um.

In FIG. 14, inflection point is shown around the shield length $L_{sh}$ of 50 um (=$D_h$). While shield length $L_{sh}$ is less than or equal to 50 um, value of "protrusion/temperature rise" is big. In other words, in case shield length $L_{sh}$ is less than or equal to the distance $D_h$ to the heater 46, thermal efficiency of TPTP phenomena becomes high. This result is considered that in case shield length $L_{sh}$ is less than or equal to the distance $D_h$ from the PTR surface 51 to the heater 46, there is no overlap portion between the shield layers and the heater 46. Furthermore, the heater 46 is placed some distance away from the MR effect layer 42c, which faces the PTR surface 51. As the result, the heat propagation from the heater 46 to the MR effect layer 42c is limited, temperature increase of the MR read head element 42 is prevented, and value of "protrusion/temperature rise" becomes big.

At the same time, in order to shield the MR effect layer 42c against the magnetic field from outside of the MR effect layer 42c, for example, generated by the inductive write head element 44 and/or the magnetic disk drive surface 52, the shield length $L_{sh}$ should be at least greater than or equal to pole length $L_p$. As long as the shield length $L_{sh}$ is greater than or equal to pole length $L_p$ of the pole layer, the shield layer effectively shield the MR effect layer 42c against the magnetic field from outside, for example by the inductive write head element 44 and/or the magnetic disk surface 52.

From the result and consideration described above, shield length $L_{sh}$, which satisfies $D_h \geq L_{sh}$, bring out the high effect of limitation against the heat propagation, and shield length $L_{sh}$, which satisfies $D_h \geq L_{sh} \geq L_p$, bring out the high effect of limitation against the heat propagation as well as shielding against the magnetic field.

Figure 15:
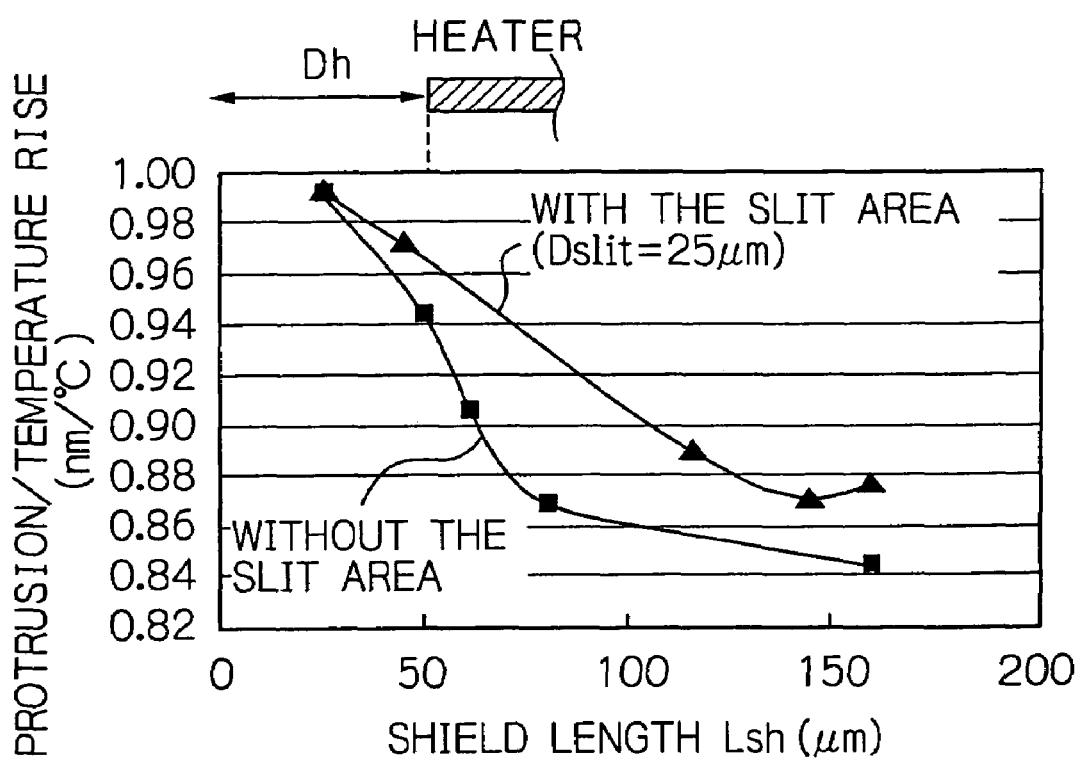
FIG. 15 shows the relation between shield length $L_{sh}$ of the MR read head element and "protrusion/temperature rise" according to the second embodiment.

FIG. 15 shows the relation between shield length $L_{sh}$ of the thin-film magnetic head and ratio of protrusion to temperature rise according to the second embodiment. In FIG. 15, the result according to the first embodiment, which has no slit area 42g is also presented. The distance $D_{slit}$ from the PTR surface 51 to the slit area 42g is 25.0 um, and the length of the slit area 42g is 5.0 um. Here shield length $L_{sh}$ means the length between one end of the shield layer and another end of the shield layer including the length of the slit area 42g. Other conditions are the same as the one shown in FIG. 14.

As shown in FIG. 15, value of "protrusion/temperature rise" with the slit area 42g provided to the both shield layers is bigger than the one that has the same shield length without the slit area 42g. It means thermal efficiency of TPTP phenomenon is improved by providing the slit area 42g.

As also shown in FIG. 15, there is no inflection point in case of "with the slit area 42g", while there is the one in case of "without the slit area 42g". It is considered that the slit area 42g is placed closer to the PTR surface 51 than the heart 46, i.e. $D_{slit}$=25 um, so that heat propagation is strongly limited by this slit area 42g, therefore critical effect, which makes inflection point and caused by the relation of shield length $L_{sh}$ to distance $D_h$ to the heater 46, is removed. By contraries, inflection point shown in the first embodiment (FIG. 14) is reinforced that it is caused by the critical effect caused by the relation of shield length $L_{sh}$ to distance $D_h$ to the heater 46.

Figure 16:
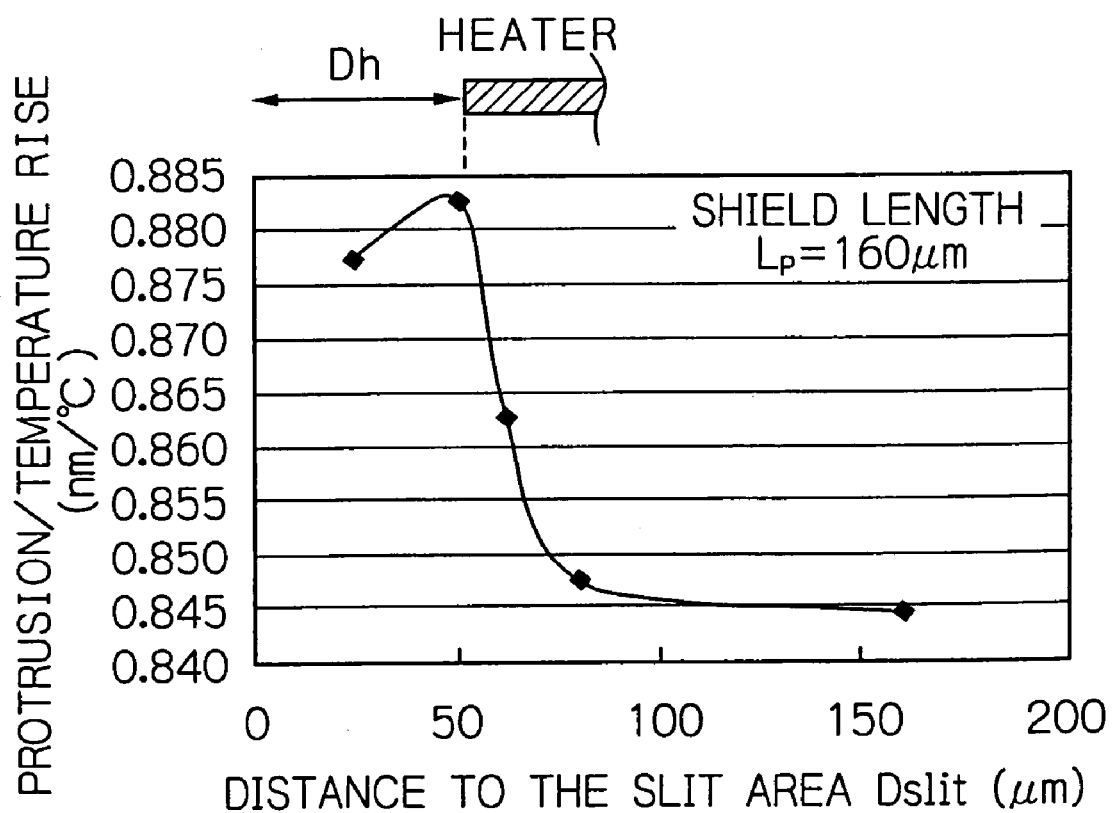
FIG. 16 shows the relation between distance $D_{slit}$ and "protrusion/temperature rise" according to the second embodiment.

FIG. 16 shows the relation between distance $D_{slit}$ from the PTR surface 51 to the slit area 42g and ratio of protrusion to temperature rise according to the second embodiment, which the slit area 42g are provided to both shield layers. The shield length $L_{sh}$, which includes the length of the slit area 42g, is 160 um, and the length of the slit area 42g is 5.0 um. Other conditions are the same as the one shown in FIG. 14.

In FIG. 16, Inflection point is shown around the distance $D_{slit}$ of 50 um (=$D_h$), and while distance $D_{slit}$ is less than or equal to 50 um, value of "protrusion/temperature rise" is big. In other words, in case distance $D_{slit}$ to the slit area 42g is less than or equal to the distance $D_h$ to the heater 46, thermal efficiency of the TPTP phenomena becomes high. This result is considered that in case distance $D_{slit}$ is less than or equal to distance $D_h$ to the heater 46, there is no overlap portion between the heater 46 and part of shield layers, which is between the PTR surface 51 and the slit area 42g. Furthermore, the heater 46 is placed some distance away from the MR effect layer 42c, which faces the PTR surface 51. As the result, the part of shield layers that is from slit area 42g to opposite side of PTR surface 51 mainly receives the heat from the heater 46, while other part of shield layer that is between the PTR surface 51 and the slit area 42g receives little amount of heat. Consequently the heat propagation from the heater 46 to the MR effect layer 42c is limited, temperature increase of the MR read head element 42 is prevented, and "protrusion/ temperature rise" becomes big.

At the same time, in order to shield MR effect layer 42c against the magnetic field from outside, for example, generated by the inductive write head element 44 and the magnetic disk surface 52, the distance $D_{slit}$ to the slit area 42g should be at least greater than or equal to pole length $L_p$. As long as distance $D_{slit}$ to the slit area 42g is greater than or equal to pole length $L_p$ of the pole layer, part of the shield layer, which is between the PTR surface 51 and the slit area 42g, effectively shield the MR effect layer 42c against the magnetic field from outside, for example, from the inductive write head element 44 and the magnetic disk surface 52.

From the result and consideration described above, distance $D_{slit}$ to the slit area 42g, which satisfies $D_h \geq D_{slit}$, bring out the high effect of limitation against heat propagation, and distance $D_{slit}$, which satisfies $D_h \geq D_{slit} \geq L_p$, bring out the high effect of limitation against heat propagation and shielding against magnetic field.

The difference of effect caused by TRTP phenomenon between the first embodiment, which has no slit area, and the second embodiment, which has slit area 42g, is described hereinafter.

Figure 17A:
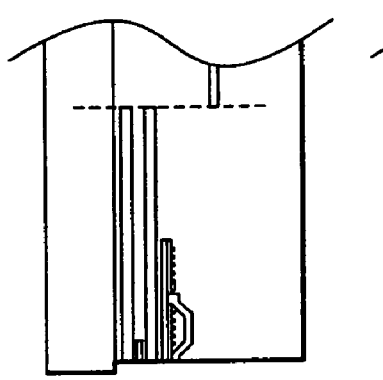
FIG. 17a shows the thin-film magnetic head according to the first embodiment with 50.0 um shield length $L_{sh}$.
Figure 17B:
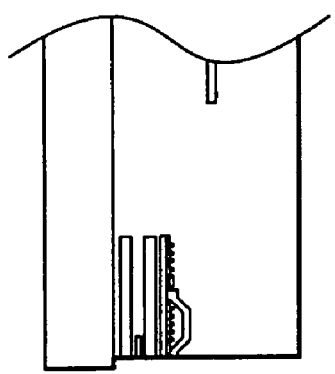
FIG. 17b shows the thin-film magnetic head according to the first embodiment with 25.0 um shield length $L_{sh}$.
Figure 17C:
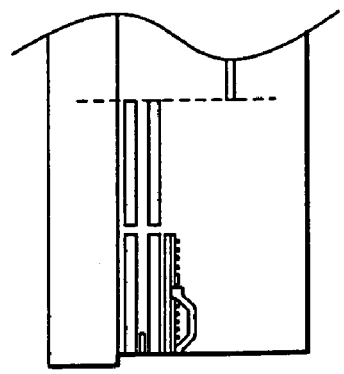
FIG. 17c shows the thin-film magnetic head according to the second embodiment with 50.0 um shield length $L_{sh}$ and 25.0 um $D_{slit}$.

FIG. 17a shows the thin-film magnetic head according to the first embodiment with 50.0 um shield length $L_{sh}$, FIG. 17b shows the thin-film magnetic head according to the first embodiment with 25.0 um shield length $L_{sh}$, and FIG. 17c shows the thin-film magnetic head according to the second embodiment with 50.0 um shield length $L_{sh}$ and 25.0 um $D_{slit}$. The distance $D_h$ to the heater 46 is 50.0 um, and pole length $L_p$ is 25.0 um, and satisfies the relation of $D_h \geq L_{sh} \geq L_p$ and $D_h \geq D_{slit} \geq L_p$. The shield length $L_{sh}$ of the FIG. 17c includes the length of the slit area 42g.

Table 1 shows simulation result about the protrusion of the inductive write head element 44 caused by self-heating and protrusion/temperature rise of the MR read head element 42 caused by the heat from the heater 46 for each structure shown in FIGS. 17a, 17b and 17c. Each value shown in Table 1 is relative value to the result of FIG. 17a, which is defined as 100.

TABLE 1

(relative value to the value of FIG. 17a as 100)

|  | Protrusion of Inductive write head element | Protrusion/temperature rise of MR read head element |
|---|---|---|
| FIG. 17a | 100 | 100 |
| FIG. 17b | 116 | 105 |
| FIG. 17c | 103 | 103 |

The simulation condition of the protrusion of the inductive write head element 44 is that no electrical current is applied to the heater 46, and electrical current of 40 mA with 300 MHz is applied to the inductive write head element 44. In other words, it shows protrusion caused by self-heating of the inductive write head element 44. Normally, this protrusion is a few times smaller than the one caused by the heater 46, however this protrusion is occurred in the order of 0.1 ms after applying the electrical current to the inductive write head element 44, and it is faster than the protrusion caused by the heater 46, which is the order of millisecond. For the purpose of controlling magnetic spacing $d_{MS}$ by applying the electrical current to the heater 46, protrusion of the inductive magnetic head element 44 caused by self-heating should be as small as possible. This makes the margin big in case of $d_{MS}$ adjusting by the heater 46.

In Table 1, "protrusion/temperature rise" of the MR read head element 42 shown in FIG. 17b is bigger than the one in FIG. 17a due to the shorter $L_{sh}$, and it means efficiency of TPTP phenomenon shown in FIG. 17b is high. However, protrusion of inductive write head element by self-heating also increases by 16%. On the contrary, in case of the thin-film magnetic head shown in FIG. 17c, which has the same shield length as the one shown in FIG. 17a, but has the slit area 42g, the thermal efficiency of TPTP phenomenon by the heater 46 is improved, and protrusion of inductive write head element by self-heating is suppressed compared to the one shown in FIG. 17b. Therefore, it is possible to realize the thin-film magnetic head that has desired adjusting margin and high response for controlling the magnetic spacing $d_{MS}$ as well as the high thermal efficiency by using the structure in accordance with the first embodiment or the second embodiment depends on purpose or situation. By providing the slit area 42g, thermal efficiency is improved, because the heat evolved by the heart 46 becomes harder to propagate to the MR read head element 42, and prevent the MR read head element from rising temperature.

The reason that protrusion is reduced in case of the thin-film magnetic head shown in FIG. 17c, which has the slit area 42g, is considered that the part of the shield layer, which is from the slit area 42g to opposite side of the PTR surface 51, acts as heat sink absorbing the heat evolved by the inductive write head element 44.

Therefore, providing the slit area 42g to the shield layer can be considered as equivalent to providing a shield layer with shield length $D_{slit}$ and a heat sink layer, which is close to and comes line with the shield layer. The structure of such a shield layer and heat sink layer close to the shield layer is within the scope of the present invention.

Clearly, the high effect of limitation against the heat propagation and shielding against the magnetic field are available by providing the several slit area 42g for each shield layer.

Also, it is clear that present invention applicable not only the thin-film magnetic head for longitudinal magnetic recording with the heater, but also the thin-film magnetic head for perpendicular magnetic recoding with heater. Even though the inductive write head element 44 has the structure suitable for the perpendicular magnetic recording, the effect of the shield layer and the slit area against the heat evolved by the heater is the same as the one mentioned above. Also it is clear that the effect against the heat and magnetic field generated by the inductive write head element is the same.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head: comprising:
   a substrate;
   a magnetic read head element having a shield area, formed on the substrate;
   a magnetic write head element having a pole area, formed on an opposite side of the magnetic read head element with respect to the substrate;
   an overcoat layer covering the magnetic read head element and the magnetic write head element, formed on the substrate;
   a heater heating at least during the magnetic read head element or the magnetic write head element in operation, formed in the overcoat layer only on an opposite side of the magnetic write head element with respect to the substrate; and
   a slit area splitting the shield area in a shield length direction, the slit area being made of a lower thermal conductivity material than a material of the shield area, wherein a distance $D_{slit}$ from an end surface of the thin-film magnetic head, where the shield area faces, to the slit area is less than or equal to a distance $D_h$ from the end surface to the heater.

2. The thin-film magnetic head according to claim 1, wherein the distance $D_{slit}$ is more than or equal to a pole length $L_p$ of the pole area.

3. The thin-film magnetic head according to claim 1, wherein the shield area comprises a lower shield layer and an upper shield layer formed on an opposite side of the lower shield layer with respect to the substrate, and
   the slit area is provided to the lower shield layer and the upper shield layer respectively.

4. The thin-film magnetic head according to claim 3, wherein a distance $LD_{slit}$ from an end surface of the thin-film magnetic head, where the lower shield layer faces, to the slit area provided to the lower shield layer is equal to a distance $UD_{slit}$ from the end surface to the slit area provided to the upper shield layer.

5. The thin-film magnetic head according to claim 1, wherein the pole area comprises a lower pole layer and an upper pole layer magnetically connecting to the lower pole layer, formed on an opposite side of the lower pole layer with respect to the substrate, and a pole length $L_p$ of the pole area is a lower pole length $LL_p$ of the lower pole layer.

6. The thin-film magnetic head according to claim 1, wherein the heater is formed on an opposite side of an end surface of the thin-film magnetic head, where the magnetic write head element and the shield area of the magnetic read head element face.

7. The thin-film magnetic head according to claim 1, wherein the magnetic read head element is a giant magnetoresistive effect element or a tunnel magnetoresistive effect element.

8. A head gimbal assembly, comprising:
the thin-film magnetic head according to claim 1;
a signal line to the magnetic read head element and the magnetic write head element;
a conductive lead to flow electrical current to the heater; and
a support means for supporting the thin-film magnetic head.

9. A magnetic disk drive apparatus, comprising:
the thin-film magnetic head according to claim 1;
a signal line to the magnetic read head element and the magnetic write head element;
a conductive lead to flow electrical current to the heater;
a support means for supporting the thin-film magnetic head; and
a control means for controlling the electrical current applied to the heater.

10. The magnetic disk drive apparatus according to claim 9, wherein the control means provides electrical current to the heater while the magnetic read head element or the magnetic write head element is in operation.

11. The magnetic disk drive apparatus according to claim 9, wherein the control means provides electrical current to the heater independent of the operation of the magnetic read head element and the magnetic write head element.

12. The magnetic disk drive apparatus according to claim 9, wherein the control means includes a sensing means for sensing acoustic emission included in read data from the magnetic read head element, and controls the electrical current applied to the heater dependent upon an amount of acoustic emission sensed by the sensing means.

13. The magnetic disk drive apparatus according to claim 9, wherein the control means includes a thermal sensor for sensing a temperature inside of the magnetic disk drive apparatus, and controls the electrical current applied to the heater dependent upon the temperature detected by the thermal sensor.

* * * * *